US008293183B2

(12) United States Patent
Mizutani et al.

(10) Patent No.: US 8,293,183 B2
(45) Date of Patent: Oct. 23, 2012

(54) HONEYCOMB FILTER

(75) Inventors: Takashi Mizutani, Tokoname (JP); Koji Nagata, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/292,757

(22) Filed: Nov. 9, 2011

(65) Prior Publication Data

US 2012/0070346 A1 Mar. 22, 2012

Related U.S. Application Data

(63) Continuation of application No. PCT/JP2011/058076, filed on Mar. 30, 2011.

(30) Foreign Application Priority Data

Mar. 31, 2010 (JP) ................................ 2010-081896

(51) Int. Cl.
*B01D 50/00* (2006.01)

(52) U.S. Cl. ....................................... 422/180; 177/178

(58) Field of Classification Search .................. 422/177, 422/178, 180; 55/523, 524; 502/100, 527.15; 428/116
See application file for complete search history.

(56) References Cited

U.S. PATENT DOCUMENTS

| 7,718,143 | B2 | 5/2010 | Ogura | |
|---|---|---|---|---|
| 2007/0048494 | A1* | 3/2007 | Miyairi et al. | 428/116 |
| 2007/0234694 | A1* | 10/2007 | Miyairi et al. | 55/523 |
| 2009/0229259 | A1 | 9/2009 | Mizutani | |
| 2009/0246453 | A1* | 10/2009 | Yamaguchi | 428/116 |
| 2009/0247396 | A1 | 10/2009 | Mizutani | |
| 2009/0274867 | A1 | 11/2009 | Hiramatsu | |
| 2010/0135866 | A1 | 6/2010 | Mizuno et al. | |

FOREIGN PATENT DOCUMENTS

| EP | 2 105 199 A1 | 9/2009 |
|---|---|---|
| EP | 2 108 494 A2 | 10/2009 |
| JP | 01-304022 A1 | 12/1989 |
| JP | 06-033734 A1 | 2/1994 |
| JP | 2002-188435 A1 | 7/2002 |
| JP | 2003-154223 A1 | 5/2003 |
| JP | 2004-216226 A1 | 8/2004 |
| JP | 2009-022953 A1 | 2/2009 |
| JP | 2009-220029 A1 | 10/2009 |
| JP | 2009-226375 A1 | 10/2009 |
| JP | 2009-226376 A1 | 10/2009 |
| JP | 2009-248070 A1 | 10/2009 |
| WO | 2008/078799 A1 | 7/2008 |
| WO | 2008/136232 A1 | 11/2008 |

* cited by examiner

*Primary Examiner* — Tom P Duong
(74) *Attorney, Agent, or Firm* — Burr & Brown

(57) ABSTRACT

A honeycomb filter includes a partition portion having a thickness $t_p$ of 150 μm or more and 460 μm or less and a trapping layer having an average thickness $t_{Ave}$ of 5 μm or more and 80 μm or less, wherein a film thickness ratio $Y_1$ of a downstream thickness $t_l$ to an up- and mid-stream thickness $t_{hm}$ satisfies a relationship according to formula (1), wherein a film thickness ratio $Y_2$ of the maximum thickness $t_{max}$ of a trapping layer to the average thickness $t_{Ave}$ of the trapping layer satisfies a relationship according to formula (2), and wherein a cell has a hydraulic diameter $HD_{in}$ satisfying a relationship according to formula (3):

$$-4/375 \cdot t_{Ave} + 2.05 \leq Y_1 \leq -17/375 \cdot t_{Ave} + 10.23 \quad (1);$$

$$Y_2 \leq -1/15 \cdot t_{Ave} + 8.33 \quad (2); \text{ and}$$

$$0.95 \leq HD_{in} \leq 2.0 \quad (3).$$

6 Claims, 14 Drawing Sheets

HONEYCOMB FILTER

TECHNICAL FIELD

The present invention relates to a honeycomb filter.

BACKGROUND ART

One proposed honeycomb filter includes a porous partition portion, in which a cell that is open at one end and closed at the other end and a cell that is closed at one end and open at the other end are alternately disposed, and a layer for trapping and removing particulate matter (hereinafter also referred to as PM) contained in an exhaust gas formed on the partition portion (see, for example, Patent Documents 1 to 3). This honeycomb filter can trap PM by the trapping layer with low pressure loss.

In another proposed honeycomb filter, a trapping layer formed on a partition portion has a decreased thickness in the central region of the honeycomb filter in the exhaust gas flow direction (see, for example, Patent Document 4). In this honeycomb filter, the permeation resistance of a partition in the central region, which generally has low exhaust gas permeability, can be decreased to increase the exhaust gas permeability, thereby increasing the amount of PM deposit in the central region. This can decrease the temperature rise in the downstream region while PM is removed by combustion.

[Patent Document 1] Japanese Unexamined Patent Application Publication No. 2004-216226
[Patent Document 2] Japanese Unexamined Patent Application Publication No. 6-33734
[Patent Document 3] Japanese Unexamined Patent Application Publication No. 1-304022
[Patent Document 4] WO 2008/136232

DISCLOSURE OF INVENTION

In honeycomb filters according to Patent Documents 1 to 3, the capacity to trap PM is improved by forming a particular layer on the partition. The particular layer has a smaller average pore size than the partition. However, this increases the permeation resistance of the partition and accordingly increases PM deposition in the downstream region, often causing a temperature rise in the downstream region while PM is removed by combustion. In accordance with Patent Document 4, an exhaust gas tends to flow through the central region, and accordingly the temperature rise in the downstream region can be decreased. However, since the trapping layer in the upstream region has a large thickness, a larger amount of exhaust gas flows to the downstream region because of the Venturi effect, for example, under high flow rate conditions, possibly increasing the amount of PM deposit in the downstream region.

In view of the situations described above, it is a principal object of the present invention to provide a honeycomb filter that has an improved capacity to trap and remove solid components contained in a fluid.

In order to achieve the principal object, the present invention has employed the following means.

The present invention provides a honeycomb filter for trapping and removing solid components contained in a fluid, the honeycomb filter including:

a plurality of porous partition portions each forming a cell, the cell being open at one end and closed at the other end and serving as a flow path of the fluid; and a trapping layer for trapping and removing the solid components contained in the fluid, the trapping layer being disposed on each of the partition portions, wherein the partition portions have a thickness $t_p$ of 150 μm or more and 460 μm or less, and the trapping layer has an average thickness $t_{Ave}$ of 5 μm or more and 80 μm or less, and a film thickness ratio $Y_1$ of a downstream thickness $t_l$ to an up- and mid-stream thickness $t_{hm}$ satisfies the relationship of the formula (1), wherein $t_h$ denotes the thickness of the trapping layer in an upstream region of the honeycomb filter, $t_m$ denotes the thickness of the trapping layer in a midstream region of the honeycomb filter, $t_l$ denotes the thickness of the trapping layer in a downstream region of the honeycomb filter, and $t_{hm}$ denotes the mean value of the upstream thickness $t_h$ and the midstream thickness $t_m$, a film thickness ratio $Y_2$ of a maximum thickness $t_{max}$ to an average thickness $t_{Ave}$ satisfies the relationship of the formula (2), wherein $t_{max}$ denotes the maximum thickness of the trapping layer, and $t_{Ave}$ denotes the average thickness of the trapping layer, and the hydraulic diameter $HD_{in}$ of the cell on the inlet side satisfies the relationship of the formula (3).

$$-4/375 \cdot t_{Ave} + 2.05 \leq Y_1 \leq -17/375 \cdot t_{Ave} + 10.23 \tag{1}$$

$$Y_2 \leq -1/15 \cdot t_{Ave} + 8.33 \tag{2}$$

$$0.95 \leq HD_{in} \leq 2.0 \tag{3}$$

In this honeycomb filter, when the partition thickness $t_p$, the average thickness $t_{Ave}$, the film thickness ratio $Y_1$ of the downstream thickness $t_l$ to the up- and mid-stream thickness $t_{hm}$, the film thickness ratio $Y_2$ of the maximum thickness $t_{max}$ to the average thickness $t_{Ave}$ of the trapping layer, and the hydraulic diameter $HD_{in}$ of the cell are in their respective appropriate ranges, the capacity to trap and remove solid components contained in the fluid can be improved. When these factors are within their specified ranges, it is possible to reduce the passage of solid components through the partition portion and the entry of the solid components into pores in the partition portion, reduce excessive deposition of the solid components in the downstream region of an inlet cell, and prevent uneven distribution of the solid components or clogging with the solid components. This also ensures an exhaust gas flow path and necessary heat capacity, thereby preventing the increase in pressure loss during the deposition of solid components, providing a high regeneration limit and increasing the trapping efficiency of solid components. In this honeycomb filter, the cells include open inlet cells, which have an open inlet and a sealed outlet, and open outlet cells, which have a sealed inlet and an open outlet. The open inlet cells and the open outlet cells may be adjacent to each other. The trapping layer may be formed of particle groups having an average particle size smaller than the average pore size of the partition portion.

In a honeycomb filter according to an aspect of the present invention, the upstream thickness $t_h$, the midstream thickness $t_m$, and the downstream thickness $t_l$ preferably satisfy the relationship of the formula (4). This allows the solid components to be trapped in the upstream region and can decrease the temperature rise in the downstream region while the solid components are removed by combustion.

$$t_h \leq t_m < t_l \tag{4}$$

In a honeycomb filter according to an aspect of the present invention, the trapping layer may be formed by supplying an inorganic material that is the raw material for the trapping layer to the cell using a gas as a transport medium. Thus, transportation with a gas can be utilized to relatively easily control the morphology, such as the thickness, of the trapping layer.

In a honeycomb filter according to an aspect of the present invention, the partition portion may contain one or more inorganic materials selected from cordierite, SiC, mullite, aluminum titanate, alumina, silicon nitride, sialon, zirconium phosphate, zirconia, titania, and silica. The trapping layer may contain one or more inorganic materials selected from cordierite, SiC, mullite, aluminum titanate, alumina, silicon nitride, sialon, zirconium phosphate, zirconia, titania, and silica. Preferably, the trapping layer is formed of the material of the partition portion.

A honeycomb filter according to an aspect of the present invention may be formed by joining two or more honeycomb segments with a bonding layer. Each of the honeycomb segments has the partition portion and the trapping layer. Joining with the bonding layer can increase the mechanical strength of the honeycomb filter.

In a honeycomb filter according to an aspect of the present invention, at least one of the partition portion and the trapping layer may be loaded with a catalyst. The catalyst can facilitate the removal of trapped solid components by combustion.

BEST MODES FOR CARRYING OUT THE INVENTION

Figure 1:
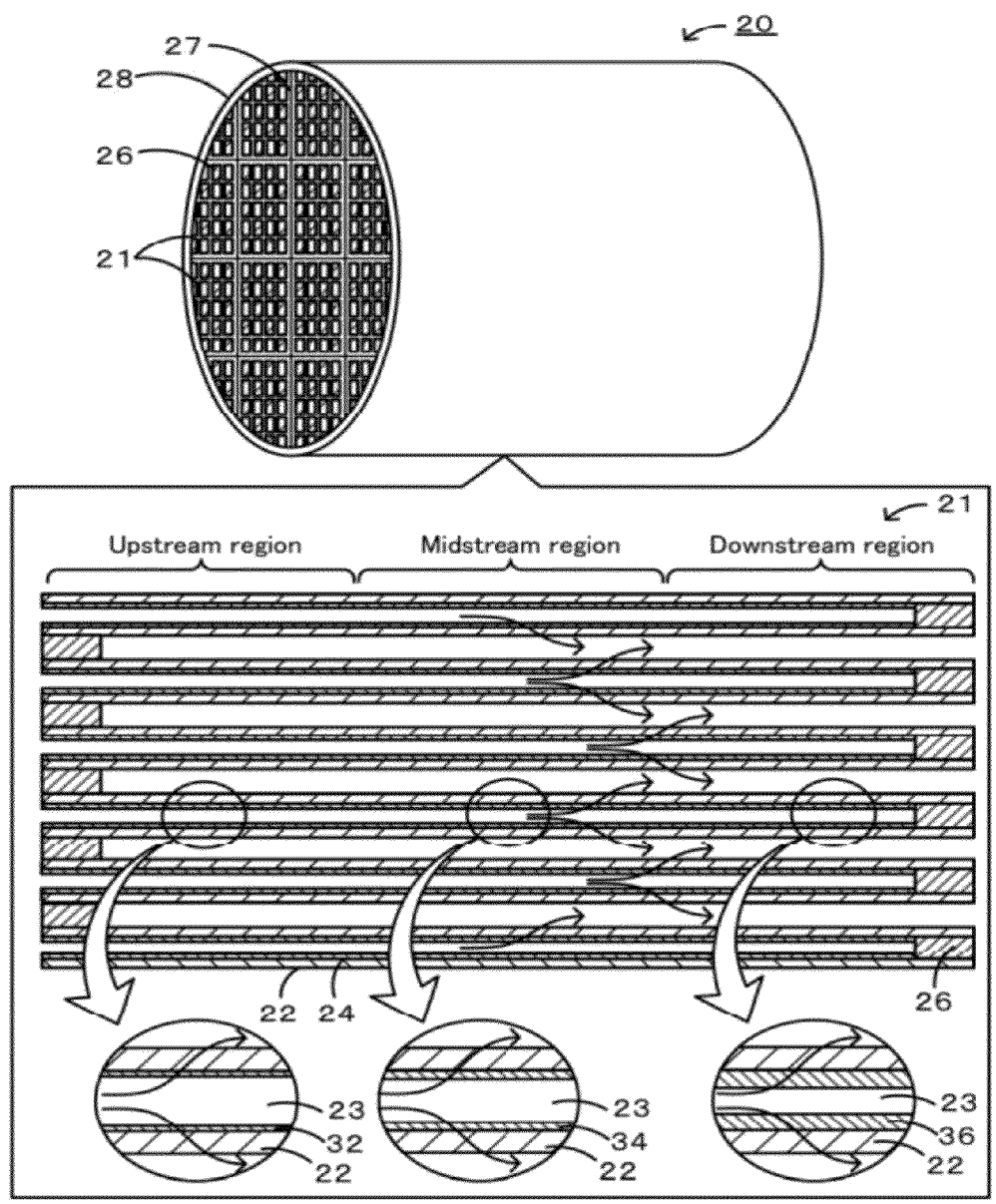
FIG. 1 is an explanatory view of the structure of a honeycomb filter 20 according to one embodiment of the present invention.
Figure 2:
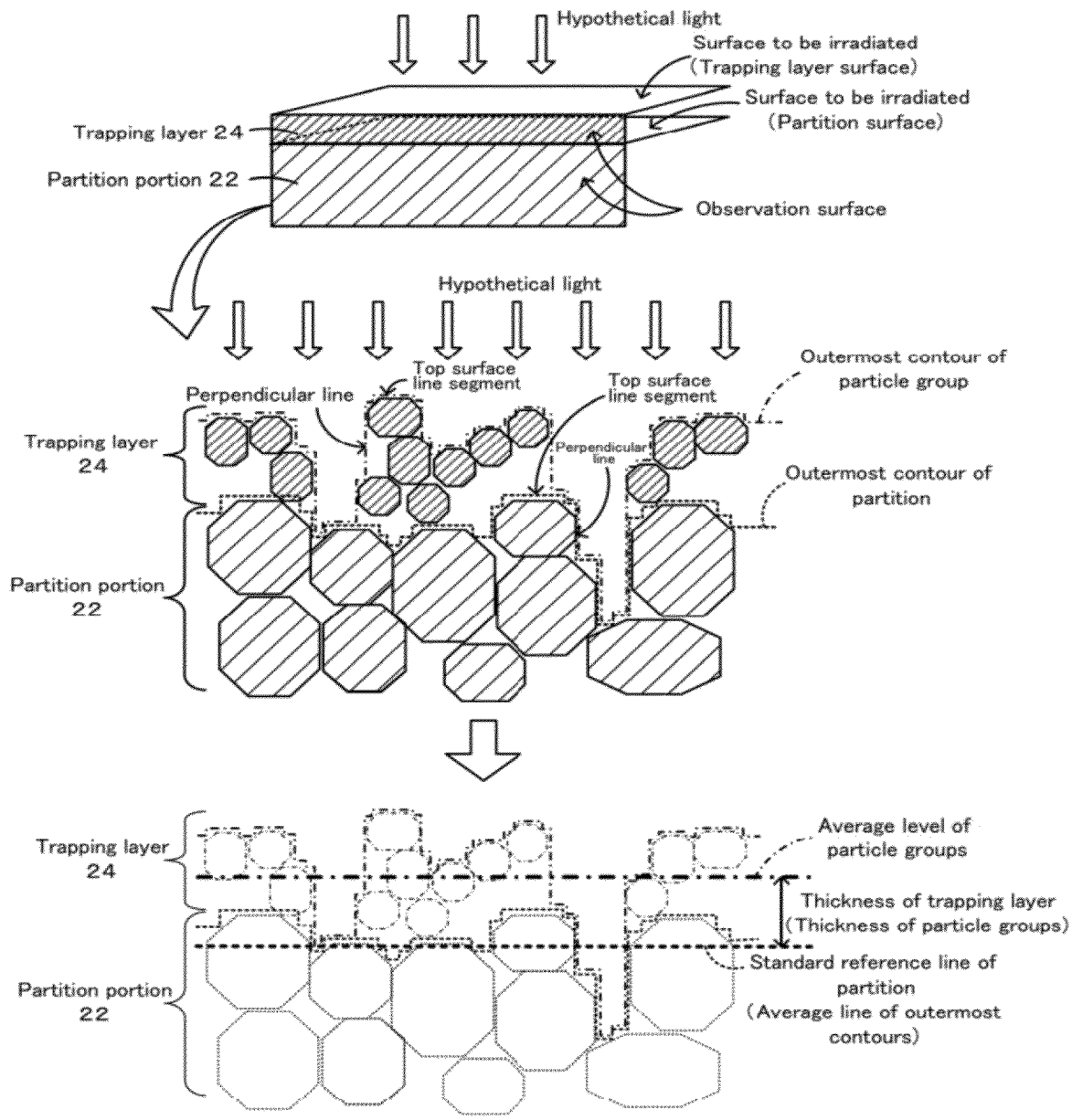
FIG. 2 is an explanatory view of a method for calculating the thickness of a trapping layer on the basis of SEM observation.
Figure 3:
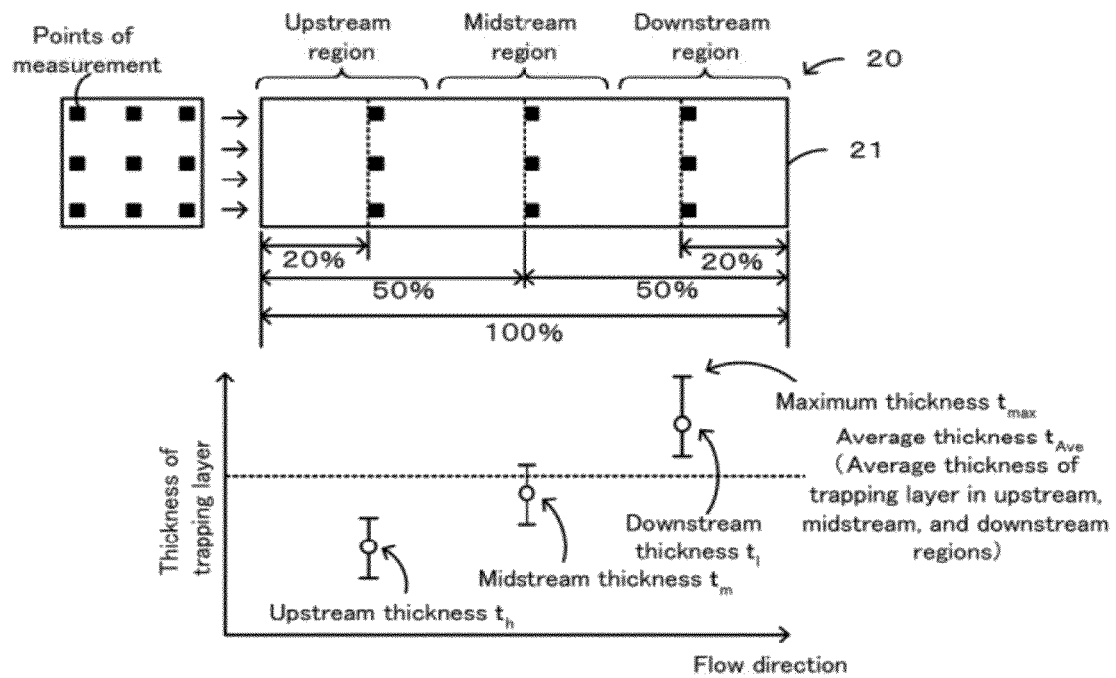
FIG. 3 is an explanatory view of measuring points at which the thickness of a trapping layer 24 is measured.

A honeycomb filter according to one embodiment of the present invention will be described below with reference to the accompanying drawings. FIG. 1 is an explanatory view of the structure of a honeycomb filter 20 according to an embodiment of the present invention. FIG. 2 is an explanatory view of a method for calculating the thickness of a trapping layer on the basis of SEM observation. FIG. 3 is an explanatory view of measuring points at which the thickness of a trapping layer 24 is measured. As illustrated in FIG. 1, the honeycomb filter 20 according to the present embodiment includes two or more honeycomb segments 21 joined together with a bonding layer 27 and an outer protective portion 28 around the honeycomb segments 21. Each of the honeycomb segments 21 includes a partition portion 22. In FIG. 1, the honeycomb filter 20 is cylindrical, each of the honeycomb segments 21 is rectangular columnar, and a cell 23 is rectangular. The honeycomb filter 20 includes a porous partition portion 22 constituting each of a plurality of cells 23, each of the cells being open at one end and sealed with a sealing portion 26 at the other end and serving as an exhaust gas flow path, and a trapping layer 24 for trapping and removing solid components (PM) contained in a fluid (exhaust gas), the trapping layer being disposed on the partition portion 22. In the honeycomb filter 20, the partition portion 22 is formed such that a cell 23 that is open at one end and closed at the other end and a cell 23 that is closed at one end and open at the other end are alternately disposed. In the honeycomb filter 20, an exhaust gas enters an inlet cell 23, passes through the trapping layer 24 and the partition portion 22, and is exhausted from an outlet cell 23, during which PM in the exhaust gas is trapped on the trapping layer 24.

In the honeycomb filter 20, the partition portion 22 has a partition thickness $t_p$ of 150 μm or more and 460 μm or less. A partition thickness $t_p$ of 150 μm or more results in a large heat capacity of the filter and a high regeneration limit. The regeneration limit is the permissible amount of PM deposit during the regeneration treatment for removing the PM deposit on the honeycomb filter 20 by combustion. A partition thickness $t_p$ of 460 μm or less results in low permeation resistance of the partition, preventing the increase in pressure loss. More specifically, the regeneration limit refers to the amount of PM deposit at which the maximum internal temperature of the honeycomb filter reaches a predetermined permissive temperature (for example, 1000° C.) while the PM deposit is removed by combustion. The partition thickness $t_p$ is preferably 200 μm or more and 400 μm or less, more preferably 280 μm or more and 350 μm or less. The partition portion 22 is porous and may contain one or more inorganic materials selected from cordierite, Si-bonded SiC, recrystallized SiC, aluminum titanate, mullite, silicon nitride, sialon, zirconium phosphate, zirconia, titania, alumina, and silica. Among these, cordierite, Si-bonded SiC, and recrystallized SiC are preferred. The partition portion 22 preferably has a porosity of 30% by volume or more and 85% by volume or less, more preferably 35% by volume or more and 65% by volume or less. The partition portion 22 preferably has an average pore size of 10 μm or more and 60 μm or less. The porosity and the average pore size of the partition portion 22 are measured by a mercury intrusion method. The partition portion 22 having such a porosity, an average pore size, and a thickness allows an exhaust gas to easily pass through the partition portion 22 and PM to be easily trapped and removed.

The trapping layer 24 for trapping and removing PM contained in an exhaust gas may be formed of particle groups having an average particle size smaller than the average pore size of the partition portion 22 and may be disposed on the partition portion 22. The trapping layer 24 preferably has an average pore size of 0.2 μm or more and 10 μm or less and a porosity of 40% by volume or more and 95% by volume or less. The average size of particles constituting the trapping layer is preferably 0.5 μm or more and 15 μm or less. An average pore size of 0.2 µm or more results in the prevention of an excessive initial pressure loss in the absence of PM deposition. An average pore size of 10 µm or less results in an improvement in trapping efficiency, the prevention of PM entering the pore of the partition portion 22 through the trapping layer 24, and the prevention of the reduction in the effect of decreasing pressure loss during PM deposition. A porosity of 40% by volume or more results in the prevention of an excessive initial pressure loss in the absence of PM deposition. A porosity of 95% by volume or less results in the formation of a surface layer serving as a durable trapping layer 24. When the average size of particles constituting the trapping layer is 0.5 µm or more, a space between the particles constituting the trapping layer can be sufficiently provided, thus ensuring high permeability of the trapping layer and preventing a sudden increase in pressure loss. When the average size of particles constituting the trapping layer is 15 µm or less, there are a sufficient number of points of contact between the particles, ensuring a sufficient bond strength between the particles and a high peel strength of the trapping layer. Thus, it is possible to maintain high PM trapping efficiency, prevent a sudden increase in pressure loss immediately after the start of PM trapping, decrease pressure loss during PM deposition, and impart durability to the trapping layer. The trapping layer 24 may be formed on the partition portion 22 of each of the exhaust gas inlet and outlet cells. As illustrated in FIG. 1, preferably, the trapping layer 24 is formed on the partition portion 22 of the inlet cell and is not formed on the partition portion 22 of the outlet cell. This allows PM contained in a fluid to be efficiently removed with low pressure loss. Furthermore, this facilitates the manufacture of the honeycomb filter 20. The trapping layer 24 may contain one or more inorganic materials selected from cordierite, SiC, mullite, aluminum titanate, alumina, silicon nitride, sialon, zirconium phosphate, zirconia, titania, and silica. Preferably, the trapping layer 24 is formed of the material of the partition portion 22. More preferably, the trapping layer 24 contains 70% by weight or more ceramic or metallic inorganic fiber. The fiber facilitates PM trapping. The inorganic fiber of the trapping layer 24 may contain one or more materials selected from aluminosilicate, alumina, silica, zirconia, ceria, and mullite. The average particle size of the particle groups constituting the trapping layer 24 is a mean value measured by observing the trapping layer 24 with a scanning electron microscope (SEM) and measuring the individual particles of the trapping layer 24 in the images obtained. The average size of raw material particles is the median size (D50) measured with a laser diffraction/scattering particle size distribution analyzer using water as a dispersion medium.

In the honeycomb filter 20, the particle groups constituting the trapping layer 24 have an average thickness $t_{Ave}$ of 5 µm or more and 80 µm or less. At an average thickness $t_{Ave}$ of 5 µm or more, PM can be properly trapped by the trapping layer 24, and high trapping efficiency can be achieved at an initial state in the absence of PM deposition. At an average thickness $t_{Ave}$ of 80 µm or less, a PM deposit layer is not excessively thick, the trapping layer does not have large permeation resistance, and the increase in pressure loss can be prevented. The average thickness $t_{Ave}$ is preferably 20 µm or more and 60 µm or less, more preferably 30 µm or more and 50 µm or less. The trapping layer 24 formed of particle groups made of an inorganic material may be formed as a uniform layer or a partial layer on the partition portion 22.

In the honeycomb filter 20, the film thickness ratio $Y_1$ ($t_l/t_{hm}$) of a downstream thickness $t_l$ to an up- and mid-stream thickness $t_{hm}$ satisfies the relationship of the formula (1), wherein an upstream thickness $t_h$ denotes the thickness of the particle groups of the trapping layer 24 in the upstream region of the honeycomb filter, a midstream thickness $t_m$ denotes the thickness of the particle groups of the trapping layer 24 in the midstream region of the honeycomb filter, a downstream thickness $t_l$ denotes the thickness of the particle groups of the trapping layer 24 in the downstream region of the honeycomb filter, and an up- and mid-stream thickness $t_{hm}$ denotes the mean value of the upstream thickness $t_h$ and the midstream thickness $t_m$. A film thickness ratio $Y_1$ of $(-4/375 \cdot t_{Ave}+2.05)$ or more results in the prevention of an increase in the amount of PM deposit in the downstream region of an inlet cell, the prevention of a sudden increase in temperature during the removal of PM by combustion, and the protection of the filter. With respect to the flow velocity distribution of the inlet channel in the honeycomb filter, the permeation resistance of a partition is generally greater than the inertial resistance or the flow path resistance. Thus, the exhaust gas permeation rate is very small in the upstream and midstream regions and large in the downstream region. In the case that a trapping layer is formed on a partition portion, in addition to the permeation resistance of the partition portion, the permeation resistance of the trapping layer increases this tendency of the flow velocity distribution, increasing the permeation rate and accordingly PM deposition in the downstream region. If abnormal combustion occurs while PM is removed by combustion, rapid combustion of PM increases the temperature in the upstream region. Heat is gradually propagated to the downstream region, causing the highest temperature in the downstream region. A large amount of PM deposit in the downstream region results in a temperature rise in the downstream region during abnormal combustion. In the honeycomb filter 20, the thickness of the trapping layer 24 in the downstream region is increased to intentionally increase the permeation resistance in the downstream region, thereby increasing the permeation rate of the partition in the upstream and midstream regions to increase the amount of PM deposit in the upstream and midstream regions. Furthermore, a high-temperature exhaust gas for burning PM can be decreased in amount in the downstream region because of large permeation resistance in the downstream region, further preventing the rapid increase in temperature in the downstream region. A film thickness ratio $Y_1$ of less than $(-17/375 \cdot t_{Ave}+10.23)$ results in a moderate thickness of the trapping layer 24 in the downstream region, thus preventing the increase in permeation resistance and the increase in pressure loss. In the honeycomb filter 20, the midstream thickness $t_m$ may be equal to or greater than the upstream thickness $t_h$, and the downstream thickness $t_l$ may be greater than the upstream thickness $t_h$ and the midstream thickness $t_m$ ($t_h \leq t_m < t_l$). In the honeycomb filter 20, as illustrated in FIG. 1, the thickness of the trapping layer 24 increases from an upstream trapping layer 32 to a midstream trapping layer 34 and from the midstream trapping layer 34 to a downstream trapping layer 36. This allows solid components to be trapped in the upstream region and can decrease the temperature rise in the downstream region while the solid components are removed by combustion.

$$-4/375 \cdot t_{Ave}+2.05 \leq Y_1 \leq -17/375 \cdot t_{Ave}+10.23 \quad (1)$$

In the honeycomb filter 20, the film thickness ratio $Y_2$ ($t_{max}/t_{Ave}$) of the maximum thickness $t_{max}$ to the average thickness $t_{Ave}$ of the particle groups constituting the trapping layer 24 satisfies the relationship of the formula (2). At a film thickness ratio $Y_2$ of $(-1/15 \cdot t_{Ave}+8.33)$ or less, a decrease in the effective area of an inlet cell corresponding to the thickness of the trapping layer in the downstream region can be compensated for by an uneven surface of the trapping layer, thereby preventing the increase in pressure loss during PM deposition. At a film thickness ratio $Y_2$ of more than $(-1/15 \cdot t_{Ave} + 8.33)$, PM is deposited on a portion having the maximum thickness $t_{max}$, which reduces PM deposition in the downstream region of this portion. This decreases the effective area and the effective volume of the inlet cell, thus increasing pressure loss during PM deposition.

$$Y_2 \leq -1/15 \cdot t_{Ave} + 8.33 \quad (2)$$

In the honeycomb filter 20, the hydraulic diameter $HD_{in}$ of the inlet cell 23 satisfies the relationship of the formula (3). When the hydraulic diameter $HD_{in}$ satisfies the formula (3), the flow path resistance can be decreased to a certain value or less while maintaining a sufficient effective area. This prevents the increase in pressure loss during PM deposition. A hydraulic diameter $HD_{in}$ of less than 0.95 results in an excessive increase in flow path resistance, thus increasing pressure loss in the absence of PM deposition and increasing pressure loss during PM deposition. A hydraulic diameter $HD_{in}$ of more than 2.0 results in a decrease in the effective area for PM deposition and a very large increase in the rate of increase in pressure loss in the presence of a certain amount of PM deposit, resulting in an increase in pressure loss during PM deposition. A method for calculating the hydraulic diameter $HD_{in}$ will be described below. The hydraulic diameter $HD_{in}$ of the inlet cell is calculated by embedding a partition substrate of the honeycomb filter 20 in a resin and polishing the resin to prepare a sample for observation, performing scanning electron microscope (SEM) observation, and analyzing the images obtained. First, after a sample for observation is used to adjust the magnification for the observation of all the inlet cells, SEM images are obtained. The area A (mm$^2$) and the perimeter L (mm) of the inlet cell coated with the trapping layer are then determined by image analysis. The hydraulic diameter is calculated by the equation: $HD_{in} = 4A/L$.

$$0.95 \leq HD_{in} \leq 2.0 \quad (3)$$

The thickness of the trapping layer 24, and the upstream, midstream, and downstream regions of the honeycomb filter 20 will be described below. First, a method for measuring the thickness of the trapping layer 24 will be described below with reference to FIG. 2. The thickness of the trapping layer 24, in other words, the thickness of the particle groups constituting the trapping layer is determined in the following manner. The thickness of the trapping layer is determined by embedding a partition substrate of the honeycomb filter 20 in a resin and polishing the resin to prepare a sample for observation, performing scanning electron microscope (SEM) observation, and analyzing the images obtained. First, the sample for observation is prepared by cutting and polishing such that a cross section perpendicular to the fluid flow direction serves as an observation surface. The observation surface of the sample for observation prepared is photographed at measuring points described below in a visual field of approximately 500 μm×500 μm at a SEM magnification in the range of 100 to 500. The outermost contour of a partition is then hypothetically drawn on the images obtained. The outermost contour of a partition is a line showing the outline of the partition and refers to a projector obtained by irradiating a partition surface (a surface to be irradiated; see the top in FIG. 2) with hypothetical parallel light in the direction perpendicular to the partition surface (see the middle in FIG. 2). The outermost contour of a partition is composed of line segments corresponding to a plurality of top surfaces of the partition at different levels irradiated with hypothetical light and perpendicular lines each connecting line segments corresponding to adjacent top surfaces of the partition at different levels. The line segments corresponding to the top surfaces of the partition are drawn at "5% resolution", in which, for example, asperities having a length of 5 μm or less are disregarded with respect to a line segment having a length of 100 μm. This prevents the occurrence of too many line segments in the horizontal direction. In the drawing of the outermost contour of a partition, the presence of a trapping layer is disregarded. Subsequently, in the same manner as in the outermost contour of a partition, the outermost contour of the particle groups constituting a trapping layer is hypothetically drawn. The outermost contour of the particle groups is a line showing the outline of the trapping layer and refers to a projector obtained by irradiating a trapping layer surface (a surface to be irradiated; see the top in FIG. 2) with hypothetical parallel light in the direction perpendicular to the trapping layer surface (see the middle in FIG. 2). The outermost contour of the particle groups is composed of line segments corresponding to a plurality of top surfaces of the particle groups at different levels irradiated with hypothetical light and perpendicular lines each connecting line segments corresponding to adjacent top surfaces of the particle groups at different levels. The line segments corresponding to the top surfaces of the particle groups are drawn, for example, at the same "resolution" as in the partition. For a porous trapping layer, in a sample for observation prepared by embedding in a resin and polishing, some particle groups are observed as if they floated in the air. The outermost contour is therefore drawn with the projector obtained by hypothetical light irradiation. Subsequently, the standard reference line of the partition is determined on the basis of the levels and lengths of the line segments of the outermost contour corresponding to the top surfaces of the partition thus drawn. The standard reference line is the average line of the outermost contour of the partition (see the bottom in FIG. 2). In the same manner as in the standard reference line of the partition, the average level of the particle groups is determined on the basis of the levels and lengths of the line segments of the outermost contour corresponding to the top surfaces of the particle groups thus drawn. The average level of the particle groups is the average line of the outermost contour of the particle groups (see the bottom in FIG. 2). The difference (length) between the average level of the particle groups and the standard reference line of the partition is considered to be the thickness of the trapping layer (the thickness of the particle groups) in the image. In this manner, the thickness of a trapping layer can be determined.

As illustrated in FIG. 3, the upstream, midstream, and downstream regions of the honeycomb filter 20 refer to three regions of an upstream zone, a middle zone, and a downstream zone in the flow path direction of the honeycomb filter 20. For a rectangular honeycomb segment 21, the upstream thickness $t_h$ is a mean value of measurements at nine points, the central point and eight points in the outer area, of a cross section located at 20% of the total length of the honeycomb segment 21 from the upstream end face in the flow path direction. Likewise, the midstream thickness $t_m$ is a mean value of measurements at nine points, the central point and eight points in the outer area, of a cross section located at 50% of the total length of the honeycomb segment 21 from the upstream end face in the flow path direction. The downstream thickness $t_l$ is a mean value of measurements at nine points, the central point and eight points in the outer area, of a cross section located at 20% of the total length of the honeycomb segment 21 from the downstream end face in the flow path direction. The upstream region, the midstream region, and the downstream region refer to regions that occupy 5% of the total length anterior and posterior to their respective cross sections. For a honeycomb filter 20 in which the honeycomb segments 21 are joined together, the thicknesses of the upstream region, the midstream region, or the downstream region of the honeycomb filter 20 are averaged to determine the upstream thickness $t_h$, the midstream thickness $t_m$, and the downstream thickness $t_l$ of the honeycomb filter 20. The up- and mid-stream thickness $t_{hm}$ refers to the mean value of the upstream thickness $t_h$ and the midstream thickness $t_m$. The average thickness $t_{Ave}$ refers to the mean value of the upstream thickness $t_h$, the midstream thickness $t_m$, and the downstream thickness $t_l$. The maximum thickness $t_{max}$ refers to the maximum value of measurements obtained at the points of measurement described above. In this manner, the thickness of the particle groups in each region can be determined.

The average pore size and the porosity of the trapping layer 24 are determined by image analysis based on SEM observation. In the same manner as in the thickness of the trapping layer, as illustrated in FIG. 2, images of a cross section of the honeycomb filter 20 are obtained with SEM. A region between the outermost contour of a partition and the outermost contour of particle groups is considered to be a region occupied by a trapping layer (a trapping layer region). In the trapping layer region, a region including the particle groups is referred to as a "particle group region", and a region including no particle group is referred to as a "pore region of the trapping layer". The area of the trapping layer region (trapping layer area) and the area of the particle group region (particle group area) are determined. The porosity of the trapping layer is calculated by dividing the particle group area by the trapping layer area and multiplying the quotient by 100. In the "pore region of the trapping layer", an incircle inscribed in the outermost contours of the particle groups and the partition and the periphery of the particle groups is drawn so that the diameter of the incircle is as large as possible. In the case that a plurality of incircles can be drawn in one "pore region of the trapping layer", for example, in the case of a rectangular pore region having a large aspect ratio, a plurality of incircles as large as possible are drawn such that the pore region is sufficiently filled with the incircles. In the image observation area, the average diameter of the incircles is considered to be the average pore size of the trapping layer. In this manner, the average pore size and the porosity of the trapping layer 24 can be determined.

A method for forming the trapping layer 24 may involve supplying a gas containing the raw material for the trapping layer to an inlet cell using a gas (air) as a transport medium for the raw material for the trapping layer. This is preferred because the particle groups constituting the trapping layer become coarse and can form a trapping layer having a very high porosity. The raw material for the trapping layer may be inorganic fiber or inorganic particles. The inorganic fiber may be that described above and preferably has an average particle size of 0.5 µm or more and 8 µm or less and an average length of 100 µm or more and 500 µm or less. The inorganic particles may be particles made of the inorganic material described above. For example, SiC particles or cordierite particles having an average size of 0.5 µm or more and 15 µm or less can be used. The raw material for the trapping layer preferably has an average particle size smaller than the average pore size of the partition portion 22. In this case, the inorganic material of the partition portion 22 is preferably the same as the inorganic material of the trapping layer 24. A gas containing inorganic particles is preferably introduced by suction on the gas outlet side. In the formation of the trapping layer 24, in addition to inorganic fiber or inorganic particles, a binding material may be supplied. The binding material may be selected from sol materials and colloid materials and is preferably colloidal silica. Preferably, the inorganic particles are coated with silica, and the inorganic particles are bound to each other with silica, and the inorganic particles are bound to the material of the partition portion with silica. In the case of an oxide material, such as cordierite or aluminum titanate, the inorganic particles are preferably bound to each other by sintering, and the inorganic particles are preferably bound to the material of the partition portion by sintering. The trapping layer 24 is preferably bonded to the partition portion 22 by forming a layer of the raw material on the partition portion 22 and performing heat treatment. The heat treatment temperature is preferably 650° C. or more and 1350° C. or less. Heat treatment at a temperature of 650° C. or more can ensure a sufficient bonding strength. Heat treatment at a temperature of 1350° C. or less can prevent the blockage of pores caused by excessive oxidation of the particles. The trapping layer 24 may be formed on the cell 23 using a slurry containing inorganic particles serving as the raw material of the trapping layer 24.

In the formation of the trapping layer 24, a solvent that is volatilized with time may be contained in the partition portion 22 in the upstream region, and the raw material particles of the trapping layer 24 may be supplied to the cell 23 using a gas. In this case, in an early stage in which the raw material particles of the trapping layer 24 are deposited on the partition portion 22, most of the raw material particles are deposited in the downstream region because of high permeation resistance. As the permeation resistance gradually decreases with the vaporization of a volatile solvent, the raw material particles begin to be deposited in a region soaked with the volatile solvent. Thus, a volatile solvent can be used to easily form the trapping layer 24 that has a large downstream thickness $t_l$. The concentration of the volatile solvent can be controlled to regulate the vaporization rate and thereby control the amount of deposition of the raw material particles in each region. Examples of the volatile solvent include organic solvents, such as alcohols, acetone, and benzene, and water. Among these, an alcohol is preferred as the volatile solvent, because the vaporization rate of the alcohol can be easily altered by mixing it with water. In this manner, the trapping layer 24 can be formed.

The bonding layer 27 is a layer for joining the honeycomb segments 21 and may contain inorganic particles, inorganic fiber, and a binding material. The inorganic particles may be particles made of the inorganic material described above and preferably have an average size of 0.1 µm or more and 30 µm or less. The inorganic fiber may be that described above and preferably has an average particle size of 0.5 µm or more and 8 µm or less and an average length of 100 µm or more and 500 µm or less. The binding material may be colloidal silica or clay. The bonding layer 27 is preferably formed in the range of 0.5 mm or more and 2 mm or less. The average particle size is the median size (D50) measured with a laser diffraction/scattering particle size distribution analyzer using water as a dispersion medium. The outer protective portion 28 is a layer for protecting the periphery of the honeycomb filter 20 and may contain the inorganic particles, the inorganic fiber, and the binding material described above.

In the honeycomb filter 20, the thermal expansion coefficient of the cell 23 in the longitudinal direction at a temperature in the range of 40° C. to 800° C. is preferably $6.0 \times 10^{-6}/°$ C. or less, more preferably $1.0 \times 10^{-6}/°$ C. or less, still more preferably $0.8 \times 10^{-6}/°$ C. or less. At a thermal expansion coefficient of $6.0 \times 10^{-6}/°$ C. or less, thermal stress generated by exposure to a high-temperature exhaust gas can be within tolerance.

The honeycomb filter 20 may have any external shape and may be cylindrical, quadrangular prismatic, cylindroid, or hexagonal columnar. The honeycomb segments 21 may have any external shape, preferably have a plane that is easy to join, and may have a square columnar (quadrangular prismatic, hexagonal columnar, or the like) cross section. The cross section of the cell may be polygonal, such as triangular, tetragonal, hexagonal, or octagonal, circular, or streamlined, such as elliptical, or combination thereof. For example, the cell 23 may have a tetragonal cross section perpendicular to the exhaust gas flow direction.

The honeycomb filter 20 preferably has a cell pitch of 1.0 mm or more and 2.5 mm or less. The pressure loss during PM deposition decreases with increasing filtration area. The initial pressure loss increases with decreasing cell diameter. Thus, the cell pitch, the cell density, and the thickness of the partition portion 22 may be determined in consideration of trade-offs between initial pressure loss, pressure loss during PM deposition, and PM trapping efficiency.

In the honeycomb filter 20, the partition portion 22 or the trapping layer 24 may contain a catalyst. The catalyst may be at least one of catalysts for promoting the combustion of trapped PM, catalysts for oxidizing unburned gases (HCs, CO, and the like) contained in an exhaust gas, and catalysts for occluding/adsorbing/decomposing $NO_x$. The catalyst can increase the efficiency of removing PM, oxidizing unburned gases, or decomposing $NO_x$. The catalyst more preferably contains at least one of noble metal elements and transition metal elements. The honeycomb filter 20 may be loaded with another catalyst or a purification material. Among those are a $NO_x$ storage catalyst containing an alkali metal (such as Li, Na, K, or Cs) or an alkaline-earth metal (such as Ca, Ba, or Sr), at least one rare-earth metal, a transition metal, a three-way catalyst, a promoter exemplified by cerium (Ce) and/or zirconium (Zr) oxide, or a hydrocarbon (HC) adsorbent. More specifically, examples of the noble metal include platinum (Pt), palladium (Pd), rhodium (Rh), gold (Au), and silver (Ag). Examples of the transition metal contained in the catalyst include Mn, Fe, Co, Ni, Cu, Zn, Sc, Ti, V, and Cr. Examples of the rare-earth metal include Sm, Gd, Nd, Y, La, and Pr. Examples of the alkaline-earth metal include Mg, Ca, Sr, and Ba. Among these, platinum and palladium are more preferred. The noble metal, the transition metal, or the promoter may be supported by a carrier having a large specific surface area. Examples of the carrier include alumina, silica, silica alumina, and zeolite. The honeycomb filter 20 containing a catalyst for promoting PM combustion can more easily remove PM trapped on the trapping layer 24. The honeycomb filter 20 containing a catalyst for oxidizing unburned gases or a catalyst for decomposing $NO_x$ can more highly purify an exhaust gas.

In the honeycomb filter according to the present embodiment, the capacity to trap and remove PM contained in an exhaust gas can be improved when the partition thickness $t_p$, the average thickness $t_{Ave}$, the film thickness ratio $Y_1$ of the downstream thickness $t_l$ to the up- and mid-stream thickness $t_{hm}$, the film thickness ratio $Y_2$ of the maximum thickness $t_{max}$ to the average thickness $t_{Ave}$ of the trapping layer, and the hydraulic diameter $HD_{in}$ of the cell are within their respective appropriate ranges. When these factors are within their specified ranges, it is possible to reduce the passage of solid components through the partition portion and the entry of the solid components into pores in the partition portion, reduce excessive deposition of the solid components in the downstream region of an inlet cell, and prevent uneven distribution of the solid components or clogging with the solid components. This also ensures an exhaust gas flow path and necessary heat capacity, thereby preventing the increase in pressure loss during the deposition of solid components, providing a high regeneration limit and increasing the trapping efficiency of solid components. A decrease in pressure loss results in a decrease in the running resistance of vehicles, thus decreasing the fuel consumed to generate power. Thus, the mileage can be improved with a decrease in pressure loss. An increase in regeneration limit results in an increase in the time interval between the combustion of PM deposit and the subsequent combustion of PM deposit, thus improving mileage. In the honeycomb filter 20 that includes the trapping layer 24 on the partition portion 22, the combination of the film thicknesses and the cell structure can be optimized to increase the capacity to trap and remove solid components contained in a fluid and improve the mileage.

It is to be understood that the present invention is not limited to the embodiments described above, and can be realized in various forms within the technical scope of the present invention.

Figure 4:
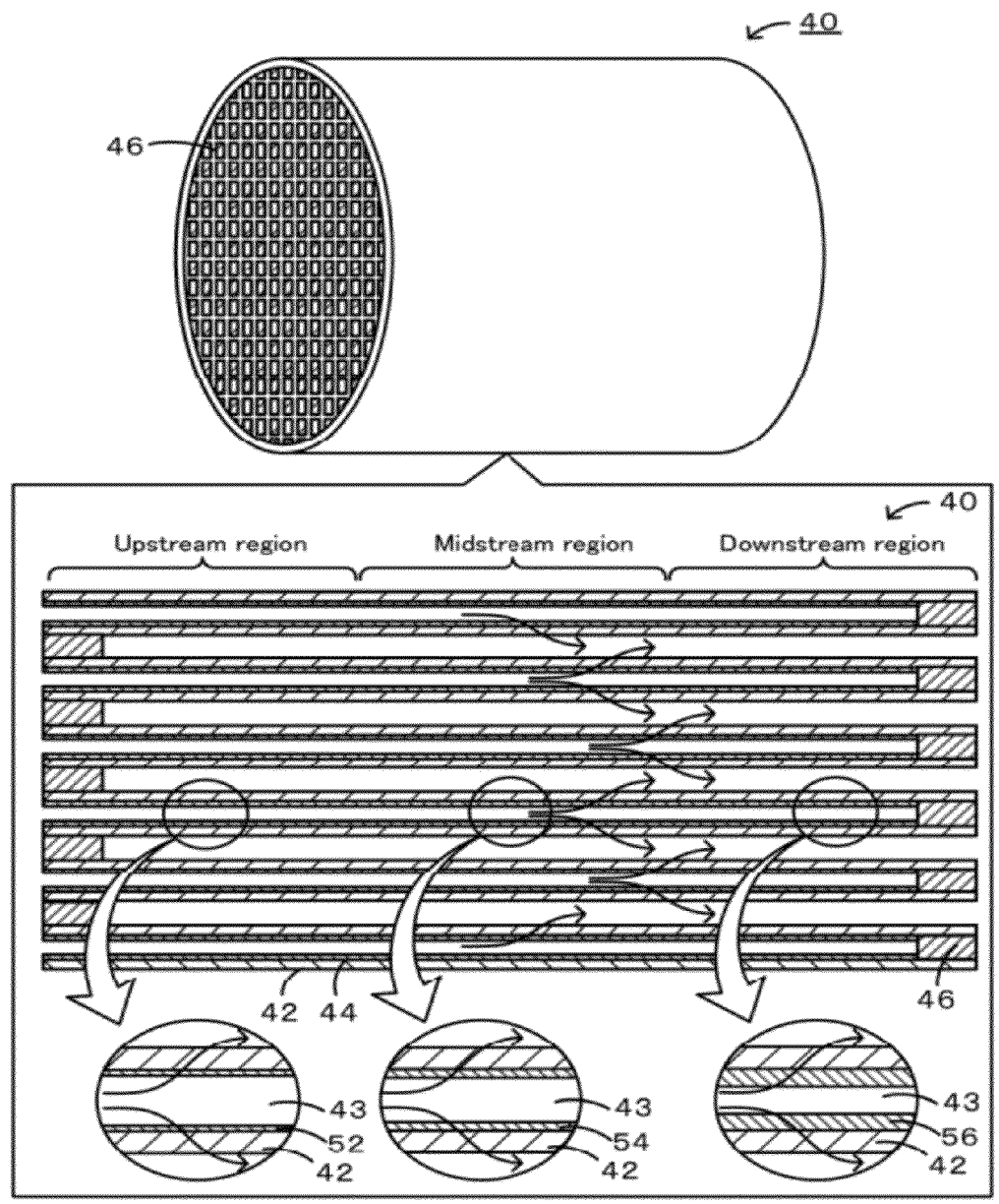
FIG. 4 is an explanatory view of the structure of an integrally molded honeycomb filter 40.

Although the honeycomb segments 21 are joined together with the bonding layer 27 in the honeycomb filter 20 according to the present embodiment, an integrally molded honeycomb filter 40 as illustrated in FIG. 4 is also suitable. In the honeycomb filter 40, partition portions 42, cells 43, trapping layers 44, sealing portions 46, upstream trapping layers 52, midstream trapping layers 54, and downstream trapping layers 56 may have the same structure as the partition portions 22, the cells 23, the trapping layers 24, the sealing portions 26, the upstream trapping layers 32, the midstream trapping layers 34, and the downstream trapping layers 36 of the honeycomb filter 20, respectively. The honeycomb filter 40 also has high capacity to trap and remove PM contained in an exhaust gas.

Although the honeycomb filter 20 contains a catalyst in the present embodiment, any honeycomb filter that can filter out substances to be removed in a fluid is suitable. The honeycomb filter 20 may contain no catalyst. Although the honeycomb filter 20 can trap PM contained in an exhaust gas, any honeycomb filter that can trap and remove solid components contained in a fluid is suitable. Also suitable are honeycomb filters for use in engines of construction equipment and honeycomb filters for use in factories and power plants.

EXAMPLES

Specific examples of the manufacture of a honeycomb filter will be described below. A honeycomb filter including honeycomb segments joined together was manufactured.

[Manufacture of Honeycomb Filter]

A SiC powder and a metallic Si powder were mixed at a mass ratio of 80:20. Methylcellulose, hydroxypropoxylmethylcellulose, a surfactant, and water were added to the mixture, which was then kneaded to prepare a plastic pug. The pug was extruded through a die to form a honeycomb segment formed product having a desired shape. The thickness of the partition portion was 305 μm, the cell pitch was 1.47 mm, the cross section was 35 mm×35 mm, and the length was 152 mm. The honeycomb segment formed product was dried using a microwave and then with hot air, was sealed, was calcined in an oxidizing atmosphere at 550° C. for three hours, and was baked in an inert atmosphere at 1400° C. for two hours. The sealing portions were formed by masking alternate cell openings of the segment formed product at one end face and immersing the masked end face in a sealing slurry containing a SiC raw material, thereby alternately forming openings and sealing portions. The other end face was then masked in the same manner. The sealing portions were formed such that a cell that is open at one end and closed at the other end and a cell that is closed at one end and open at the other end are alternately disposed. Air containing SiC particles having an average size smaller than the average pore size of the partition was introduced from open ends of the honeycomb segment fired product on the exhaust gas inlet side while drawn in by suction from the outlet side of the honeycomb segments. The SiC particles were deposited on the surface layer of the partition on the exhaust gas inlet side. A trapping layer was formed on the partition portion such that the trapping layer had a thickness distribution in the flow direction by thickness distribution treatment described below. Heat treatment in the atmosphere at 1300° C. for two hours was performed to join the SiC particles deposited on the surface layer of the partition together and the deposited SiC particles and SiC and Si particles constituting the partition together. Thus, honeycomb segments were formed in which the trapping layer was formed on the partition portion. A binder slurry prepared by kneading alumina silicate fiber, colloidal silica, poly(vinyl alcohol), silicon carbide, and water was applied to a side surface of each of the honeycomb segments thus formed. The honeycomb segments were assembled and pressed against each other and were heat-dried to form a tetragonal honeycomb segment assembly. The honeycomb segment assembly was cylindrically ground. A coating slurry composed of the same materials as the binder slurry was then applied to the honeycomb segment assembly and was hardened by drying to manufacture a cylindrical honeycomb filter having a desired shape, segment shape, and cell structure. The honeycomb filter had a cross section diameter of 144 mm and a length of 152 mm. In Examples 1 to 30 and Comparative Examples 1 to 24 described below, the porosity of the partition portion was 40% by volume, the average pore size was 15 μm, and the average size of particles forming the trapping layer was 2.0 μm. In Examples 1 to 26 and Comparative Examples 1 to 22 described below, the partition thickness $t_p$ was 305 μm. The porosity and the average pore size of the partition portion were measured with a mercury porosimeter (Auto Pore III 9405 manufactured by Micromeritics). The average size of the raw material particles of the trapping layer is the median size (D50) measured with a laser diffraction/scattering particle size distribution analyzer (LA-910 manufactured by Horiba, Ltd.) using water as a dispersion medium.

[Thickness Distribution Treatment of Trapping Layer]

Alcohol solutions of different concentrations were prepared. The upstream region and the midstream region of a honeycomb segment were soaked with the alcohol solution. Within a predetermined time after that, SiC particles to form the particle groups of a trapping layer were supplied together with air and were deposited on a partition portion. In an early stage of deposition, most of the SiC particles are deposited in the downstream region because of high permeation resistance. As the permeation resistance gradually decreases with the vaporization of the alcohol solution, the SiC particles begin to be deposited in a region soaked with the alcohol solution. The concentration of the alcohol solution was controlled to regulate the vaporization rate and thereby control the amount of deposition of the SiC particles in each region. For example, in Comparative Example 9 described below, a 95% aqueous alcohol was prepared. A 100-mm upstream portion of the honeycomb filter was immersed in the alcohol solution. After removal of the residual alcohol solution, a predetermined amount of SiC particles was supplied to the inlet cell together with air by suction from the outlet side to form a trapping layer. In Comparative Example 9 thus produced, the average thickness $t_{Ave}$ was 40 μm, the film thickness ratio $Y_1$ was 1.5, and the film thickness ratio $Y_2$ was 1.0. In Example 10, an 89% aqueous alcohol was prepared, and a trapping layer was formed in the same manner as in Comparative Example 9. In Example 10 thus produced, the average thickness $t_{Ave}$ was 40 μm, the film thickness ratio $Y_1$ was 2.1, and the film thickness ratio $Y_2$ was 1.7. In Example 11, a 32% aqueous alcohol was prepared, and a trapping layer was formed in the same manner as in Comparative Example 9. In Example 11 thus produced, the average thickness $t_{Ave}$ was 40 μm, the film thickness ratio $Y_1$ was 8.4, and the film thickness ratio $Y_2$ was 1.5. In the honeycomb segment 21, the upstream thickness was a mean value of measurements at nine points, the central point and eight points in the outer area, of a cross section located at 20% of the total length from the upstream end face. The midstream thickness was a mean value of measurements at nine points, the central point and eight points in the outer area, of a cross section located at 50% of the total length from the upstream end face. The downstream thickness was a mean value of measurements at nine points, the central point and eight points in the outer area, of a cross section located at 20% of the total length from the downstream end face. The upstream thickness $t_h$, the midstream thickness $t_m$, and the downstream thickness $t_l$ of the honeycomb filter were the mean value of the upstream thicknesses $t_h$, the mean value of the midstream thicknesses $t_m$, and the mean value of the downstream thicknesses $t_l$ of all the honeycomb segments.

[Catalyst Loading]

Raw materials of alumina:platinum:ceria-based material=7:0.5:2.5 based on the weight ratio in which the ceria-based material was Ce:Zr:Pr:Y:Mn=60:20:10:5:5 based on the weight ratio were mixed to prepare an aqueous catalyst slurry. The outlet end face (exhaust gas outlet side) of a honeycomb segment was immersed in the catalyst slurry up to a predetermined height. The catalyst slurry was drawn in by suction from the inlet end face (exhaust gas inlet side) at a predetermined suction pressure and suction flow rate for a predetermined time to allow the catalyst to be loaded on the partition, was dried at 120° C. for two hours, and was baked at 550° C. for one hour. The amount of catalyst per unit volume of honeycomb filter was 30 g/L.

Comparative Examples 1 and 2

The amounts of alcohol solution and SiC particles supplied were adjusted such that the upstream thickness $t_h$ was 1.2 μm, the midstream thickness $t_m$ was 2.6 μm, and the downstream thickness $t_l$ was 7.8 μm. The resulting honeycomb filter was referred to as Comparative Example 1. In Comparative Example 1, the maximum thickness $t_{max}$ was 7.6 μm, the film thickness ratio $Y_1$ was 4.1, and the film thickness ratio $Y_2$ was 2.0. The amounts of alcohol solution and SiC particles supplied were adjusted such that the upstream thickness $t_h$ was 2.4 μm, the midstream thickness $t_m$ was 2.8 μm, and the downstream thickness $t_l$ was 7.4 μm. The resulting honeycomb filter was referred to as Comparative Example 2. In Comparative Example 2, the maximum thickness $t_{max}$ was 8.1 μm, the film thickness ratio $Y_1$ was 2.8, and the film thickness ratio Y was 1.9.

Examples 1 to 4

The amounts of alcohol solution and SiC particles supplied were adjusted such that the upstream thickness $t_h$ was 3.7 μm, the midstream thickness $t_m$ was 3.9 μm, and the downstream thickness $t_l$ was 7.4 μm. The resulting honeycomb filter was referred to as Example 1. In Example 1, the maximum thickness $t_{max}$ was 7.6 μm, the film thickness ratio $Y_1$ was 2.0, and the film thickness ratio $Y_2$ was 1.6. In Examples 1 to 4 and Comparative Examples 3 to 5, the average thickness $t_{Ave}$ was 5 μm. The amounts of alcohol solution and SiC particles supplied were adjusted such that the upstream thickness $t_h$ was 1.8 μm, the midstream thickness $t_m$ was 3.1 μm, and the downstream thickness $t_l$ was 11 μm. The resulting honeycomb filter was referred to as Example 2. In Example 2, the maximum thickness $t_{max}$ was 14 μm, the film thickness ratio $Y_1$ was 4.5, and the film thickness ratio $Y_2$ was 2.6. The amounts of alcohol solution and SiC particles supplied were adjusted such that the upstream thickness $t_h$ was 1.1 μm, the midstream thickness $t_m$ was 1.4 μm, and the downstream thickness $t_l$ was 13 μm. The resulting honeycomb filter was referred to as Example 3. In Example 3, the maximum thickness $t_{max}$ was 32 μm, the film thickness ratio $Y_1$ was 10.0, and the film thickness ratio $Y_2$ was 6.4. The amounts of alcohol solution and SiC particles supplied were adjusted such that the upstream thickness $t_h$ was 1.1 μm, the midstream thickness $t_m$ was 1.4 μm, and the downstream thickness $t_l$ was 13 μm. The resulting honeycomb filter was referred to as Example 4. In Example 4, the maximum thickness $t_{max}$ was 40 μm, the film thickness ratio Y, was 10.0, and the film thickness ratio $Y_2$ was 8.0.

Comparative Examples 3 to 5

The amounts of alcohol solution and SiC particles supplied were adjusted such that the upstream thickness $t_h$ was 3.7 μm, the midstream thickness $t_m$ was 3.9 μm, and the downstream thickness $t_l$ was 7.4 μm. The resulting honeycomb filter was referred to as Comparative Example 3. In Comparative Example 3, the maximum thickness $t_{max}$ was 7.6 μm, the film thickness ratio $Y_1$ was 1.9, and the film thickness ratio $Y_2$ was 1.5. The amounts of alcohol solution and SiC particles supplied were adjusted such that the upstream thickness $t_h$ was 1.1 μm, the midstream thickness $t_m$ was 1.4 μm, and the downstream thickness $t_l$ was 13 μm. The resulting honeycomb filter was referred to as Comparative Example 4. In Comparative Example 4, the maximum thickness $t_{max}$ was 42 μm, the film thickness ratio $Y_1$ was 10.0, and the film thickness ratio $Y_2$ was 8.4. The amounts of alcohol solution and SiC particles supplied were adjusted such that the upstream thickness $t_h$ was 1.0 μm, the midstream thickness $t_m$ was 1.1 μm, and the downstream thickness $t_l$ was 13 μm. The resulting honeycomb filter was referred to as Comparative Example 5. In Comparative Example 5, the maximum thickness $t_{max}$ was 18 μm, the film thickness ratio $Y_1$ was 12.4, and the film thickness ratio $Y_2$ was 3.6.

Examples 5 to 8

The amounts of alcohol solution and SiC particles supplied were adjusted such that the upstream thickness $t_h$ was 14 μm, the midstream thickness $t_m$ was 18 μm, and the downstream thickness $t_l$ was 28 μm. The resulting honeycomb filter was referred to as Example 5. In Example 5, the maximum thickness $t_{max}$ was 38 μm, the film thickness ratio $Y_1$ was 1.8, and the film thickness ratio $Y_2$ was 1.9. In Examples 5 to 8 and Comparative Examples 6 to 8, the average thickness $t_{max}$ was 20 μm. The amounts of alcohol solution and SiC particles supplied were adjusted such that the upstream thickness $t_h$ was 10 μm, the midstream thickness $t_m$ was 13 μm, and the downstream thickness $t_l$ was 38 μm. The resulting honeycomb filter was referred to as Example 6. In Example 6, the maximum thickness $t_{max}$ was 45 μm, the film thickness ratio $Y_1$ was 3.3, and the film thickness ratio $Y_2$ was 2.2. The amounts of alcohol solution and SiC particles supplied were adjusted such that the upstream thickness $t_h$ was 5.2 μm, the midstream thickness $t_m$ was 5.6 μm, and the downstream thickness $t_l$ was 50 μm. The resulting honeycomb filter was referred to as Example 7. In Example 7, the maximum thickness $t_{max}$, was 55 μm, the film thickness ratio $Y_1$ was 9.2, and the film thickness ratio $Y_2$ was 2.7. The amounts of alcohol solution and SiC particles supplied were adjusted such that the upstream thickness $t_h$ was 5.2 μm, the midstream thickness $t_m$ was 5.6 μm, and the downstream thickness $t_l$ was 50 μm. The resulting honeycomb filter was referred to as Example 8. In Example 8, the maximum thickness $t_{max}$ was 140 μm, the film thickness ratio $Y_1$ was 9.2, and the film thickness ratio $Y_2$ was 7.0.

Comparative Examples 6 to 8

The amounts of alcohol solution and SiC particles supplied were adjusted such that the upstream thickness $t_h$ was 15 μm, the midstream thickness $t_m$ was 18 μm, and the downstream thickness $t_l$ was 27 μm. The resulting honeycomb filter was referred to as Comparative Example 6. In Comparative Example 6, the maximum thickness $t_{max}$ was 35 μm, the film thickness ratio $Y_1$ was 1.6, and the film thickness ratio $Y_2$ was 1.8. The amounts of alcohol solution and SiC particles supplied were adjusted such that the upstream thickness $t_h$ was 5.2 μm, the midstream thickness $t_m$ was 5.6 μm, and the downstream thickness $t_l$ was 50 μm. The resulting honeycomb filter was referred to as Comparative Example 7. In Comparative Example 7, the maximum thickness $t_{max}$ was 150 μm, the film thickness ratio $Y_1$ was 9.2, and the film thickness ratio $Y_2$ was 7.5. The amounts of alcohol solution and SiC particles supplied were adjusted such that the upstream thickness $t_h$ was 4.6 μm, the midstream thickness $t_m$ was 5.4 μm, and the downstream thickness $t_l$ was 50 μm. The resulting honeycomb filter was referred to as Comparative Example 8. In Comparative Example 8, the maximum thickness $t_{max}$ was 60 μm, the film thickness ratio $Y_1$ was 10.0, and the film thickness ratio $Y_2$ was 3.0.

Examples 9 to 12

The amounts of alcohol solution and SiC particles supplied were adjusted such that the upstream thickness $t_h$ was 31 μm, the midstream thickness $t_m$ was 35 μm, and the downstream thickness $t_l$ was 54 μm. The resulting honeycomb filter was referred to as Example 9. In Example 9, the maximum thickness $t_{max}$ was 72 μm, the film thickness ratio $Y_1$ was 1.6, and the film thickness ratio $Y_2$ was 1.8. In Examples 9 to 12 and Comparative Examples 9 to 11, the average thickness $t_{Ave}$ was 40 μm. The amounts of alcohol solution and SiC particles supplied were adjusted such that the upstream thickness $t_h$ was 21 μm, the midstream thickness $t_m$ was 38 μm, and the downstream thickness $t_l$ was 61 μm. The resulting honeycomb filter was referred to as Example 10. In Example 10, the maximum thickness $t_{max}$ was 68 μm, the film thickness ratio $Y_1$ was 2.1, and the film thickness ratio $Y_2$ was 1.7. The amounts of alcohol solution and SiC particles supplied were adjusted such that the upstream thickness $t_h$ was 9.0 μm, the midstream thickness $t_m$ was 14 μm, and the downstream thickness $t_l$ was 97 μm. The resulting honeycomb filter was referred to as Example 11. In Example 11, the maximum thickness $t_{max}$ was 60 μm, the film thickness ratio $Y_1$ was 8.4, and the film thickness ratio $Y_2$ was 1.5. The amounts of alcohol solution and SiC particles supplied were adjusted such that the upstream thickness $t_h$ was 9.0 μm, the midstream thickness $t_m$ was 14 μm, and the downstream thickness $t_{max}$ was 97 μm. The resulting honeycomb filter was referred to as Example 11. In Example 11, the maximum thickness was 226 μm, the film thickness ratio $Y_1$ was 8.4, and the film thickness ratio $Y_2$ was 5.7.

Comparative Examples 9 to 11

The amounts of alcohol solution and SiC particles supplied were adjusted such that the upstream thickness $t_h$ was 33 µm, the midstream thickness $t_m$ was 36 µm, and the downstream thickness $t_l$ was 51 µm. The resulting honeycomb filter was referred to as Comparative Example 9. In Comparative Example 9, the maximum thickness $t_{max}$ was 40 µm, the film thickness ratio $Y_1$ was 1.5, and the film thickness ratio $Y_2$ was 1.0. The amounts of alcohol solution and SiC particles supplied were adjusted such that the upstream thickness $t_h$ was 9.0 µm, the midstream thickness $t_m$ was 14 µm, and the downstream thickness $t_l$ was 97 µm. The resulting honeycomb filter was referred to as Comparative Example 10. In Comparative Example 10, the maximum thickness $t_{max}$ was 240 µm, the film thickness ratio $Y_1$ was 8.4, and the film thickness ratio $Y_2$ was 6.0. The amounts of alcohol solution and SiC particles supplied were adjusted such that the upstream thickness $t_h$ was 8.0 µm, the midstream thickness $t_m$ was 12 µm, and the downstream thickness $t_l$ was 100 µm. The resulting honeycomb filter was referred to as Comparative Example 11. In Comparative Example 11, the maximum thickness $t_{max}$ was 120 µm, the film thickness ratio $Y_1$ was 10.0, and the film thickness ratio $Y_2$ was 3.0.

Examples 13 to 16

The amounts of alcohol solution and SiC particles supplied were adjusted such that the upstream thickness $t_h$ was 50 µm, the midstream thickness $t_m$ was 56 µm, and the downstream thickness $t_l$ was 74 µm. The resulting honeycomb filter was referred to as Example 13. In Example 13, the maximum thickness $t_{max}$ was 75 µm, the film thickness ratio $Y_1$ was 1.4, and the film thickness ratio $Y_2$ was 1.3. In Examples 13 to 16 and Comparative Examples 12 to 14, the average thickness $t_{Ave}$ was 60 µm. The amounts of alcohol solution and SiC particles supplied were adjusted such that the upstream thickness $t_h$ was 42 µm, the midstream thickness $t_m$ was 48 µm, and the downstream thickness $t_l$ was 89 µm. The resulting honeycomb filter was referred to as Example 14. In Example 14, the maximum thickness $t_{max}$ was 90 µm, the film thickness ratio $Y_1$ was 2.0, and the film thickness ratio $Y_2$ was 1.5. The amounts of alcohol solution and SiC particles supplied were adjusted such that the upstream thickness $t_h$ was 15 µm, the midstream thickness $t_m$ was 23 µm, and the downstream thickness $t_l$ was 142 µm. The resulting honeycomb filter was referred to as Example 15. In Example 15, the maximum thickness $t_{max}$ was 118 µm, the film thickness ratio $Y_1$ was 7.5, and the film thickness ratio $Y_2$ was 2.0. The amounts of alcohol solution and SiC particles supplied were adjusted such that the upstream thickness $t_h$ was 15 µm, the midstream thickness $t_m$ was 23 µm, and the downstream thickness $t_l$ was 142 µm. The resulting honeycomb filter was referred to as Example 16. In Example 16, the maximum thickness $t_{max}$ was 260 µm, the film thickness ratio $Y_1$ was 7.5, and the film thickness ratio $Y_2$ was 4.3.

Comparative Examples 12 to 14

The amounts of alcohol solution and SiC particles supplied were adjusted such that the upstream thickness $t_h$ was 52 µm, the midstream thickness $t_m$ was 57 µm, and the downstream thickness $t_l$ was 71 µm. The resulting honeycomb filter was referred to as Comparative Example 12. In Comparative Example 12, the maximum thickness $t_{max}$ was 72 µm, the film thickness ratio $Y_1$ was 1.3, and the film thickness ratio $Y_2$ was 1.2. The amounts of alcohol solution and SiC particles supplied were adjusted such that the upstream thickness $t_h$ was 15 µm, the midstream thickness $t_m$ was 23 µm, and the downstream thickness $t_l$ was 142 µm. The resulting honeycomb filter was referred to as Comparative Example 13. In Comparative Example 13, the maximum thickness $t_{max}$ was 270 µm, the film thickness ratio $Y_1$ was 7.5, and the film thickness ratio $Y_2$ was 4.5. The amounts of alcohol solution and SiC particles supplied were adjusted such that the upstream thickness $t_h$ was 14 µm, the midstream thickness $t_m$ was 21 µm, and the downstream thickness $t_l$ was 145 µm. The resulting honeycomb filter was referred to as Comparative Example 14. In Comparative Example 14, the maximum thickness $t_{max}$ was 155 µm, the film thickness ratio $Y_1$ was 8.3, and the film thickness ratio $Y_2$ was 2.6.6.

Examples 17 to 20

The amounts of alcohol solution and SiC particles supplied were adjusted such that the upstream thickness $t_h$ was 79 µm, the midstream thickness $t_m$ was 76 µm, and the downstream thickness $t_l$ was 90 µm. The resulting honeycomb filter was referred to as Example 17. In Example 17, the maximum thickness $t_{max}$ was 106 µm, the film thickness ratio $Y_1$ was 1.2, and the film thickness ratio $Y_2$ was 1.3. In Examples 17 to 20 and Comparative Examples 15 to 18, the average thickness $t_{Ave}$ was 80 µm. The amounts of alcohol solution and SiC particles supplied were adjusted such that the upstream thickness $t_h$ was 53 µm, the midstream thickness $t_m$ was 72 µm, and the downstream thickness $t_l$ was 114 µm. The resulting honeycomb filter was referred to as Example 18. In Example 18, the maximum thickness $t_{max}$ was 128 µm, the film thickness ratio $Y_1$ was 1.8, and the film thickness ratio $Y_2$ was 1.6. The amounts of alcohol solution and SiC particles supplied were adjusted such that the upstream thickness $t_h$ was 22 µm, the midstream thickness $t_m$ was 34 µm, and the downstream thickness $t_l$ was 184 µm. The resulting honeycomb filter was referred to as Example 19. In Example 19, the maximum thickness $t_m$ was 198 µm, the film thickness ratio $Y_1$ was 6.6, and the film thickness ratio $Y_2$ was 2.5. The amounts of alcohol solution and SiC particles supplied were adjusted such that the upstream thickness $t_h$ was 22 µm, the midstream thickness $t_m$ was 34 µm, and the downstream thickness $t_l$ was 184 µm. The resulting honeycomb filter was referred to as Example 20. In Example 20, the maximum thickness $t_{max}$ was 238 µm, the film thickness ratio $Y_1$ was 6.6, and the film thickness ratio $Y_1$ was 2.5.

Comparative Examples 15 to 17

The amounts of alcohol solution and SiC particles supplied were adjusted such that the upstream thickness $t_h$ was 75 µm, the midstream thickness $t_m$ was 78 µm, and the downstream thickness $t_l$ was 7.4 µm. The resulting honeycomb filter was referred to as Comparative Example 15. In Comparative Example 15, the maximum thickness $t_{max}$ was 92 µm, the film thickness ratio $Y_1$ was 1.1, and the film thickness ratio $Y_2$ was 1.2. The amounts of alcohol solution and SiC particles supplied were adjusted such that the upstream thickness $t_h$ was 22 µm, the midstream thickness $t_m$ was 34 µm, and the downstream thickness $t_l$ was 184 µm. The resulting honeycomb filter was referred to as Comparative Example 16. In Comparative Example 16, the maximum thickness $t_{max}$ was 250 µm, the film thickness ratio $Y_1$ was 6.6, and the film thickness ratio $Y_2$ was 3.1. The amounts of alcohol solution and SiC particles supplied were adjusted such that the upstream thickness $t_h$ was 21 µm, the midstream thickness $t_m$ was 33 µm, and the downstream thickness $t_l$ was 186 µm. The resulting honeycomb filter was referred to as Comparative Example 17. In Comparative Example 17, the maximum thickness $t_{max}$ was 210 μm, the film thickness ratio $Y_1$ was 6.9, and the film thickness ratio $Y_2$ was 2.6.

Comparative Examples 18 to 20

The amounts of alcohol solution and SiC particles supplied were adjusted such that the upstream thickness $t_h$ was 58 μm, the midstream thickness $t_m$ was 75 μm, and the downstream thickness $t_l$ was 120 μm. The resulting honeycomb filter was referred to as Comparative Example 18. In Comparative Example 18, the average thickness $t_{Ave}$ was 84 μm, the maximum thickness $t_{max}$ was 132 μm, the film thickness ratio $Y_a$ was 1.8, and the film thickness ratio $Y_2$ was 1.6. The amounts of alcohol solution and SiC particles supplied were adjusted such that the upstream thickness $t_h$ was 42 μm, the midstream thickness $t_m$ was 58 μm, and the downstream thickness $t_l$ was 155 μm. The resulting honeycomb filter was referred to as Comparative Example 19. In Comparative Example 19, the average thickness $t_{Ave}$ was 85 μm, the maximum thickness $t_{max}$ was 164 μm, the film thickness ratio $Y_1$ was 3.1, and the film thickness ratio $Y_2$ was 1.9. The amounts of alcohol solution and SiC particles supplied were adjusted such that the upstream thickness $t_h$ was 28 μm, the midstream thickness $t_m$ was 37 μm, and the downstream thickness $t_l$ was 190 μm. The resulting honeycomb filter was referred to as Comparative Example 20. In Comparative Example 20, the average thickness $t_{Ave}$ was 85 μm, the maximum thickness $t_{max}$ was 195 μm, the film thickness ratio $Y_1$ was 5.8, and the film thickness ratio $Y_2$ was 2.3.

Examples 21 to 26

The hydraulic diameters $HD_{in}$'s of inlet cells were 2.0, 1.7, 1.4, 1.2, 1.1, and 0.97 mm. The resulting honeycomb filters were referred to as Examples 21 to 26, respectively. In Examples 21 to 26 and Comparative Examples 21 and 22, the upstream thickness $t_h$ was 21 μm, the midstream thickness $t_m$ was 38 μm, and the downstream thickness $t_l$ was 61 μm, the average thickness $t_{Ave}$ was 40 μm, the maximum thickness $t_{max}$ was 68 μm, the film thickness ratio $Y_1$ was 2.1, and the film thickness ratio $Y_2$ was 1.7.

Comparative Examples 21 and 22

The hydraulic diameters $HD_{in}$'s of inlet cells were 2.1 and 0.92 mm. The resulting honeycomb filters were referred to as Comparative Examples 21 and 22, respectively.

Examples 27 to 30

The partition thicknesses $t_p$'s were 152, 254, 356, and 457 μm. The resulting honeycomb filters were referred to as Examples 27 to 30, respectively. In Examples 27 to 30 and Comparative Examples 23 and 24, the upstream thickness $t_h$ was 21 μm, the midstream thickness $t_m$ was 38 μm, the downstream thickness $t_l$ was 61 μm, the average thickness $t_{Ave}$ was 40 μm, the maximum thickness $t_{max}$ was 68 μm, the film thickness ratio $Y_1$ was 2.1, and the film thickness ratio $Y_2$ was 1.7.

Comparative Examples 23 and 24

The partition thicknesses $t_p$'s were 140 and 470 μm. The resulting honeycomb filters were referred to as Comparative Examples 23 and 24, respectively.

[SEM Photography]

Figure 5:
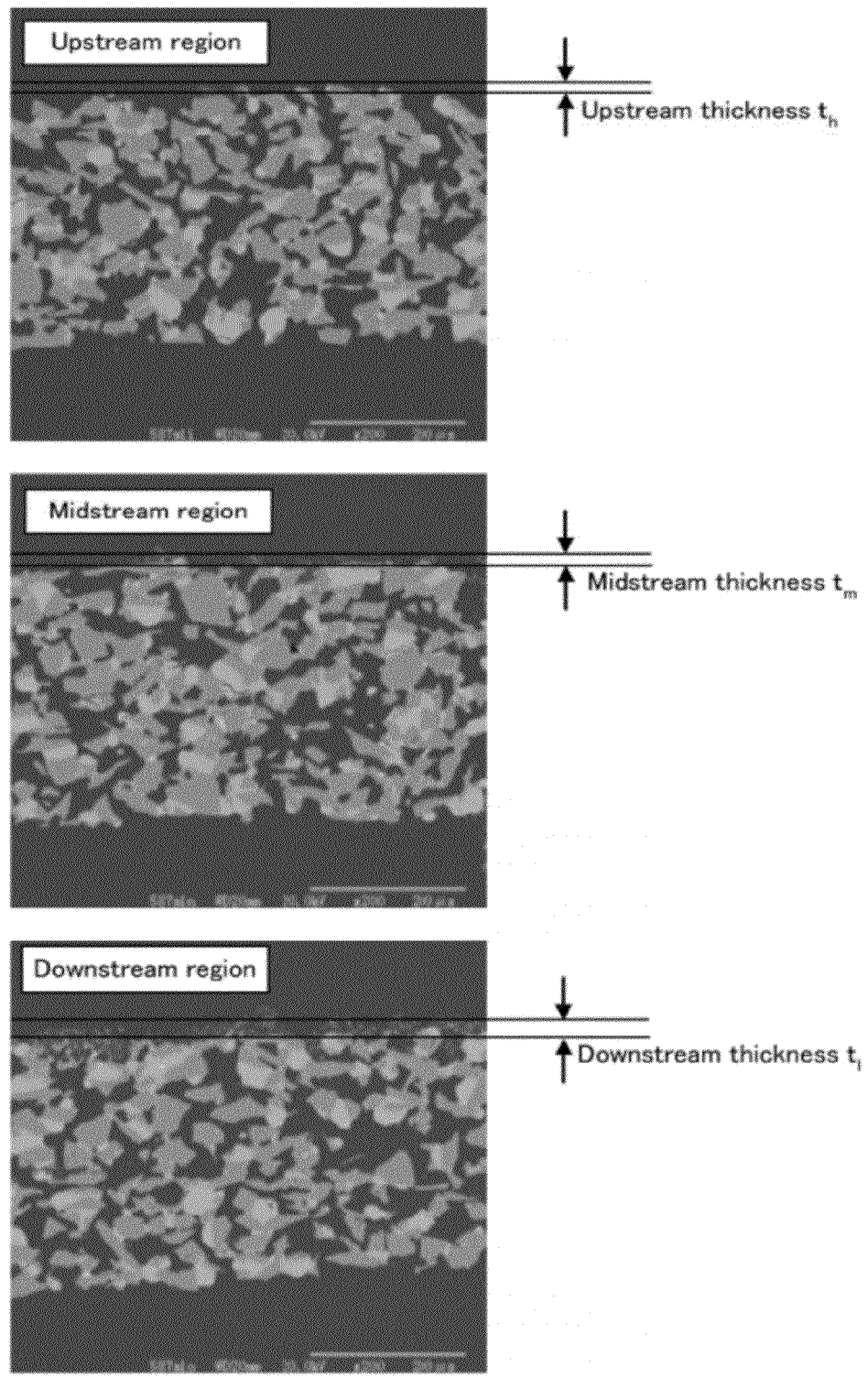
FIG. 5 shows SEM images of cross sections of a partition portion according to Example 10.
Figure 6:
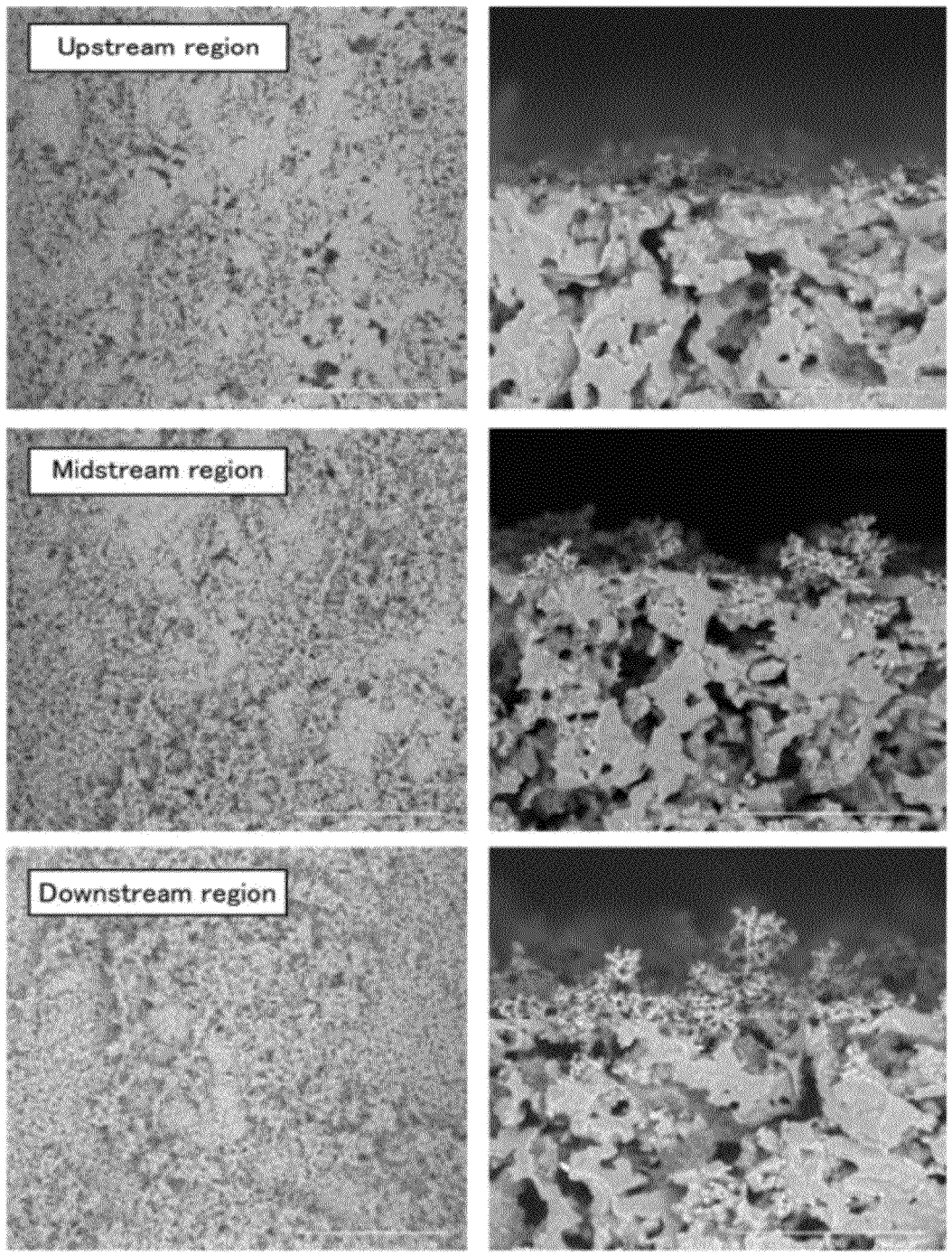
FIG. 6 shows SEM images of a honeycomb filter having a cordierite monolithic structure.

SEM images of cross sections of the honeycomb filter thus manufactured were obtained with a scanning electron microscope (S-3200N manufactured by Hitachi High-Technologies Corp.). FIG. 5 shows the SEM images of cross sections of a partition portion according to Example 10. FIG. 5 shows that the downstream thickness $t_l$ is larger than the up- and mid-stream thickness $t_{hm}$. The thickness of the trapping layer 24 was also determined from the SEM images. First, a sample for observation was prepared by embedding a partition substrate of the honeycomb filter in a resin and cutting and polishing such that a cross section perpendicular to the fluid flow direction served as an observation surface. The observation surface of the sample for observation was photographed at measuring points described below in a visual field of approximately 500 μm×500 μm at a SEM magnification in the range of 100 to 500. The measuring points were nine points, that is, one point in the central region and eight points in its outer region, of a cross section 15 mm away from the inlet end face, a cross section of the central portion, and a cross section 15 mm upstream from the outlet end face of the honeycomb filter (see FIG. 3). The outermost contour of the partition was then hypothetically drawn on the image obtained. The outermost contour of the partition refers to a projector obtained by irradiating a partition surface with hypothetical light in the direction perpendicular to the partition surface. Likewise, the outermost contour of the particle groups constituting the trapping layer was hypothetically drawn. The outermost contour of the particle groups refers to a projector obtained by irradiating a surface of the particle groups with hypothetical light in the direction perpendicular to the trapping layer surface. Subsequently, the standard reference line of the partition was determined on the basis of the levels and lengths of the line segments of the outermost contour corresponding to the top surfaces of the partition thus drawn. The standard reference line is the average line of the outermost contour of the partition. In the same manner as in the standard reference line of the partition, the average level of the particle groups was determined on the basis of the levels and lengths of the line segments of the outermost contour corresponding to the top surfaces of the particle groups thus drawn. The average level of the particle groups is the average line of the outermost contour of the particle groups. The difference (length) between the average level of the particle groups and the standard reference line of the partition was considered to be the thickness of the trapping layer (the thickness of the particle groups) in the image. The upstream thickness $t_h$, the midstream thickness $t_m$, the downstream thickness $t_l$, the average thickness $t_{Ave}$, the maximum thickness $t_{max}$, the film thickness ratio $Y_1$, and the film thickness ratio $Y_2$ were determined, for example, by averaging the thickness of the trapping layer in the upstream, midstream, and downstream regions using the thickness of the trapping layer. In another example, a honeycomb filter having a monolithic structure in which a trapping layer was formed in the same manner as in the example described above was manufactured with cordierite. SEM images of a surface and a cross section of a cell were obtained. FIG. 6 shows SEM images of the honeycomb filter having the cordierite monolithic structure. FIG. 6 also shows that the downstream thickness $t_l$ is larger than the up- and mid-stream thickness $t_{hm}$. The hydraulic diameter $HD_{in}$ was calculated using a sample for observation. After a sample for observation was used to adjust the magnification for the observation of all the inlet cells, SEM images were obtained. The area A (mm²) and the perimeter L (mm) of the inlet cells coated with the trapping layer were determined by image analysis. The hydraulic diameter was calculated by the equation: $HD_{in}=4A/L$.

[Pressure Loss Test]

The honeycomb filter thus manufactured was installed in a 2.0-L diesel engine. The pressure loss behavior was observed during PM deposition in a steady state at an engine speed of 2200 rpm at a torque of 45 Nm. The weight of the honeycomb filter was measured before and after the engine test. The amount of PM deposit during the test was calculated by reducing the weight before the test from the weight after the test. The pressure loss in relation to the amount of PM deposit was determined on the assumption that PM was generated at a constant rate. The pressure loss at a PM deposition of 4 g/L was used for the performance evaluation of the honeycomb filter.

[Initial Trapping Efficiency]

During PM deposition under the same conditions as in the pressure loss test, the PM concentrations in the upstream region and the downstream region of the honeycomb filter were measured with a scanning mobility particle sizer (SMPS). The trapping efficiency of the honeycomb filter was calculated from the decrease ratio of the PM concentration in the downstream region to the PM concentration in the upstream region of the honeycomb filter. The trapping efficiency immediately after the start of the test when the trapping efficiency was lowest was considered to be the initial trapping efficiency.

[Regeneration Limit]

After PM deposition under the same conditions as in the pressure loss test, the inlet gas temperature of the honeycomb filter was increased to 650° C. by post-injection. When PM deposit on the honeycomb filter began to burn and when the pressure loss of the honeycomb filter began to decrease, the post-injection was stopped, and simultaneously the engine was idled. At that time a high oxygen content and a low flow rate cause abnormal combustion of residual PM within the honeycomb filter, rapidly increasing the internal temperature of the honeycomb filter. The high temperature causes degradation of a catalyst applied to the honeycomb filter, resulting in low unburned gas purification efficiency. The time of PM deposition was controlled to regulate the amount of PM deposit before post-injection, thereby achieving a desired amount of PM deposit. While gradually increasing the amount of PM deposit, the internal temperature of the honeycomb filter was measured. In general, catalysts can be degraded at a temperature in the range of approximately 900° C. to 1000° C. When the catalyst applied in the present example is subjected to a thermal history of 1000° C., the unburned gas purification efficiency in regeneration treatment is decreased by 20%. Taking emission in the regeneration treatment into account, the vehicle emission may exceed the emission limit. Thus, in this regeneration limit test, the amount of PM deposit when the maximum internal temperature of the honeycomb filter reached 1000° C. was considered to be the regeneration limit of the honeycomb filter.

Experimental Results

Figure 7:
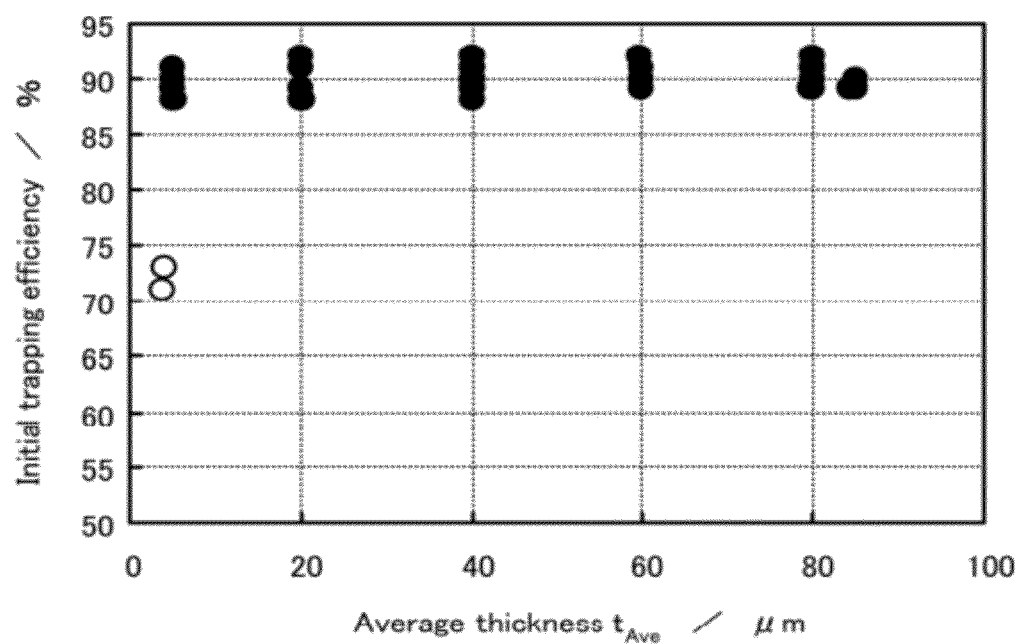
FIG. 7 is a graph showing the measurements of initial trapping efficiency as a function of the average thickness $t_{Ave}$.
Figure 8:
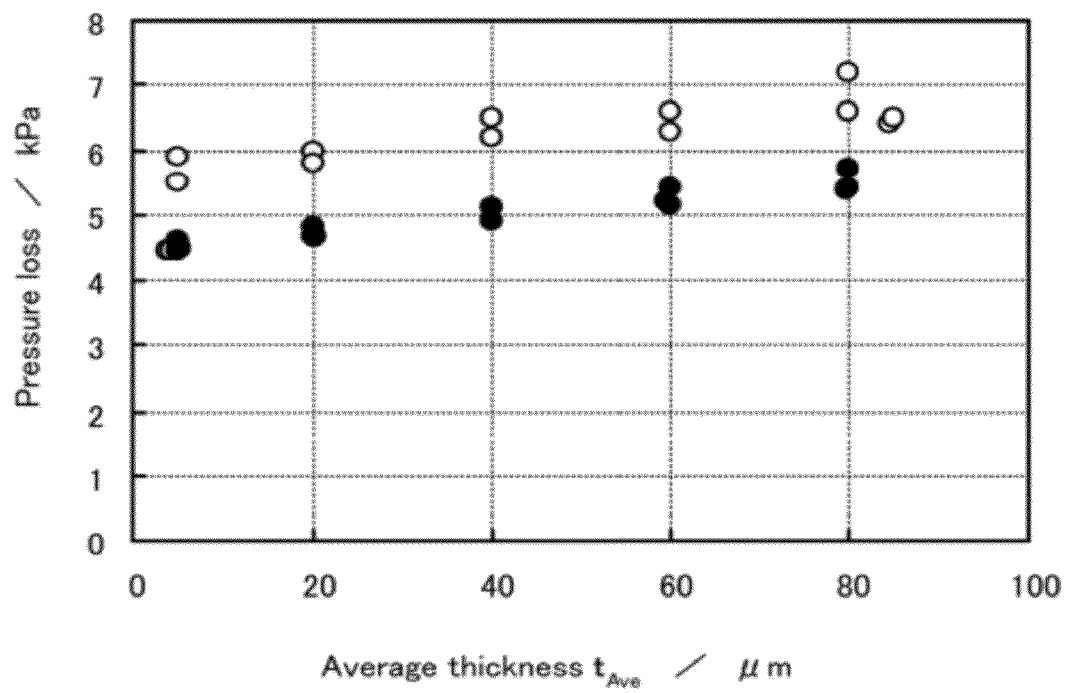
FIG. 8 is a graph showing the measurements of pressure loss as a function of the average thickness $t_{Ave}$.
Figure 9:
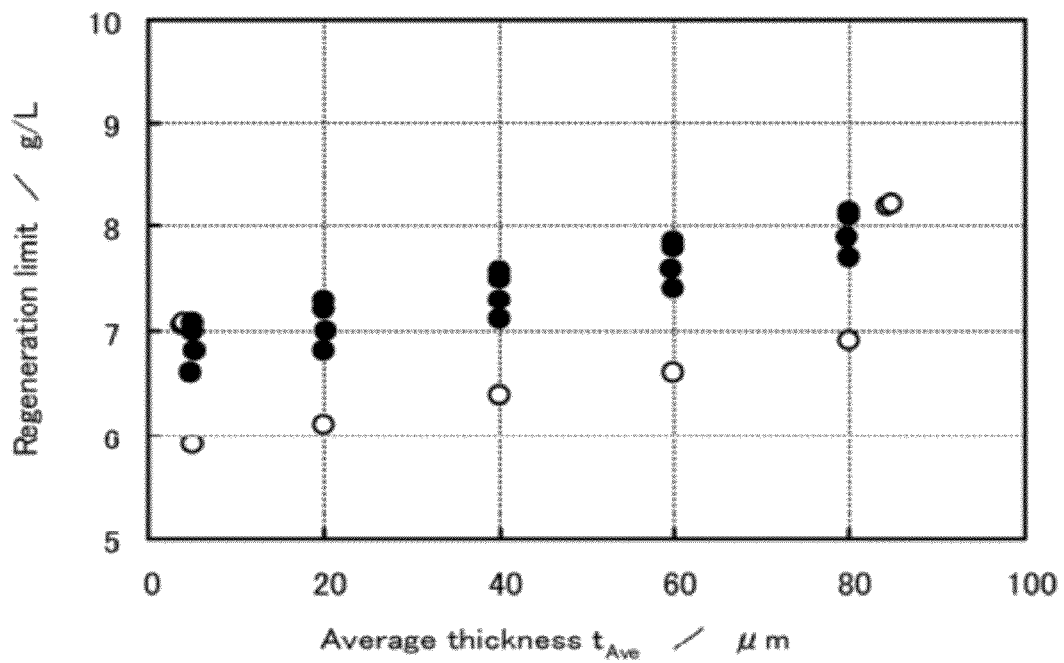
FIG. 9 is a graph showing the measurements of regeneration limit as a function of the average thickness $t_{Ave}$.
Figure 10:
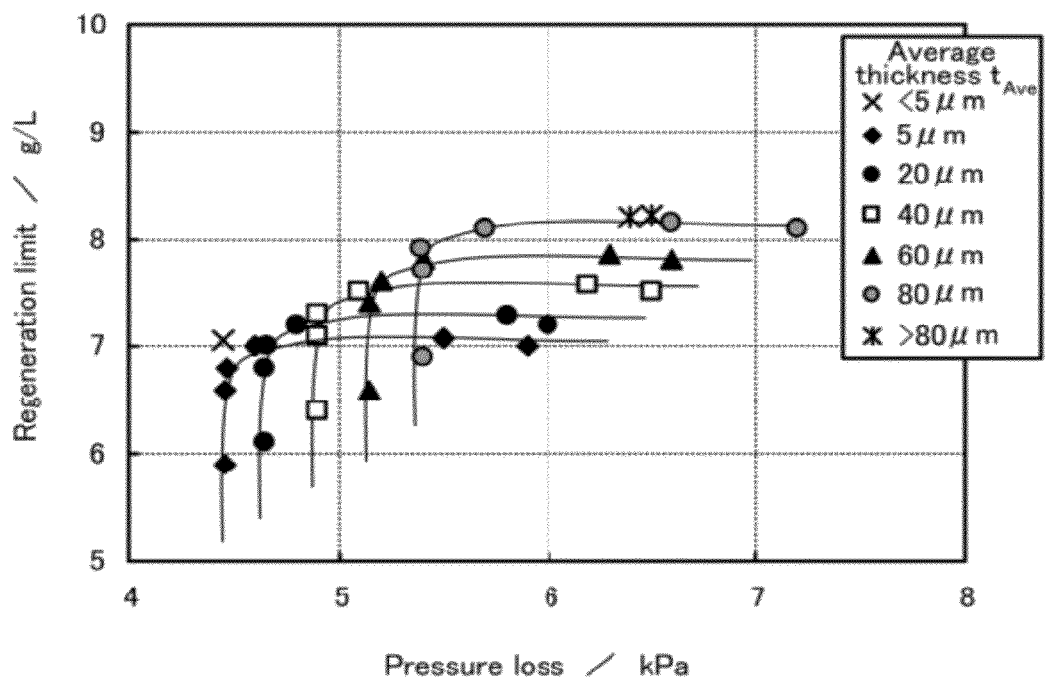
FIG. 10 is a graph summarizing regeneration limit as a function of the pressure loss.
Figure 11:
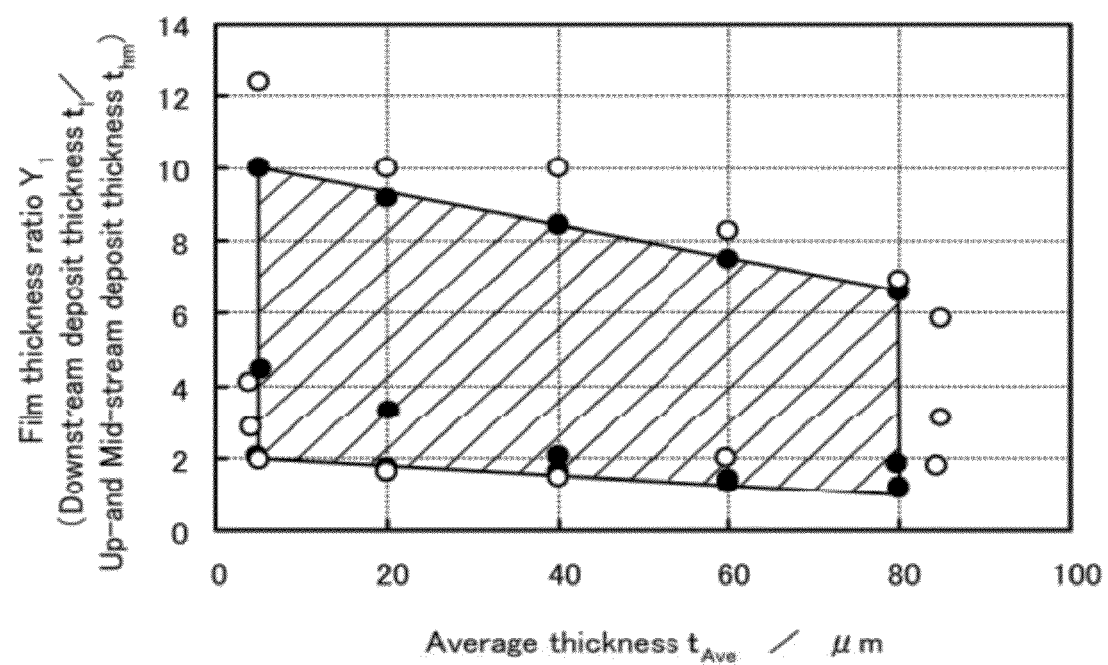
FIG. 11 is a graph summarizing the film thickness ratio $Y_1$ as a function of the average thickness $t_{Ave}$.
Figure 12:
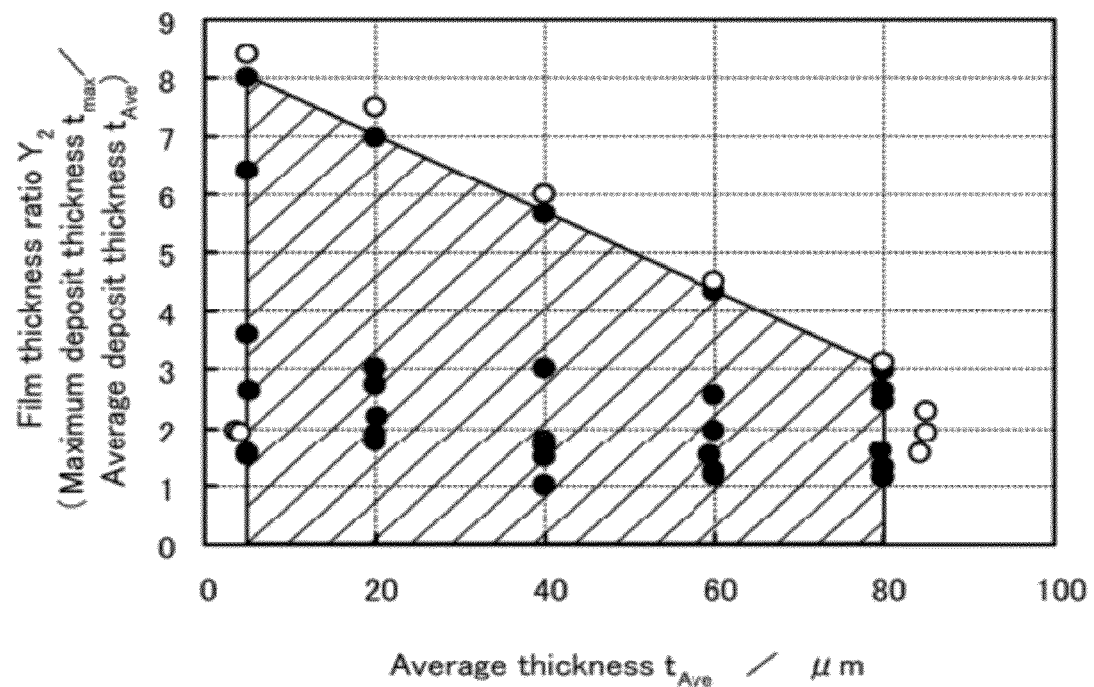
FIG. 12 is a graph summarizing the film thickness ratio $Y_2$ as a function of the average thickness $t_{Ave}$.
Figure 13:
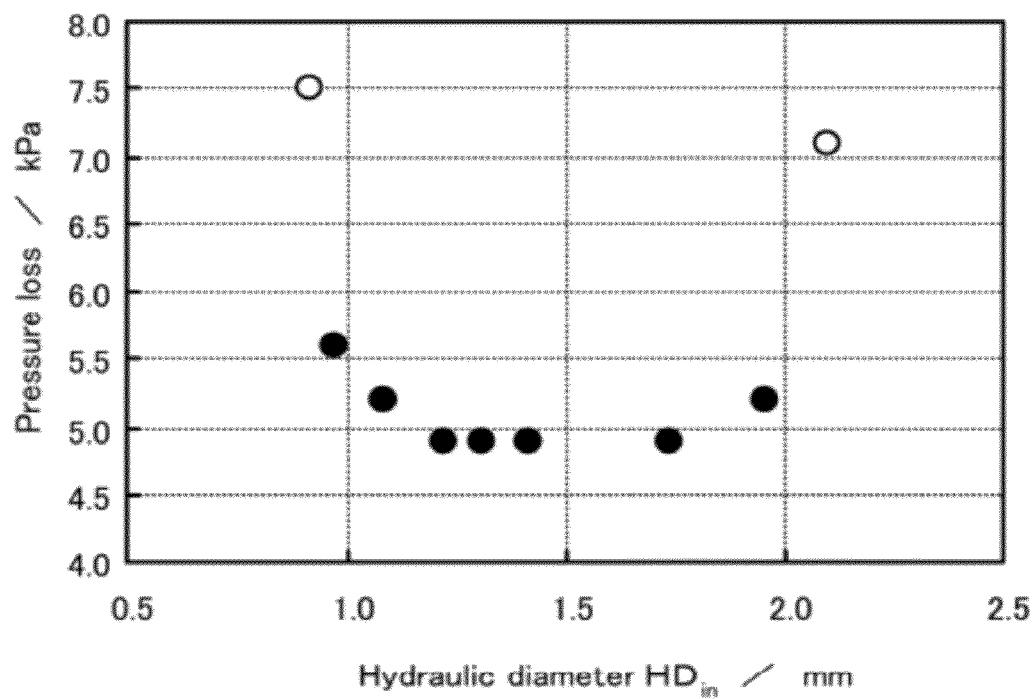
FIG. 13 is a graph showing the measurements of pressure loss as a function of the hydraulic diameter $HD_{in}$ of an inlet cell.
Figure 14:
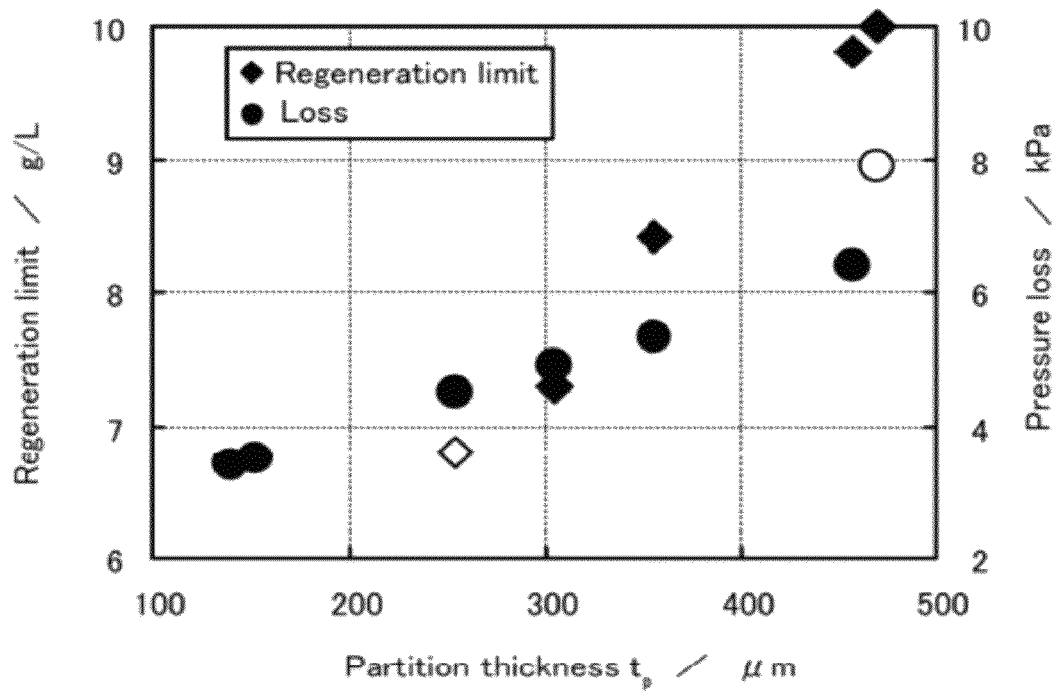
FIG. 14 is a graph showing the measurements of pressure loss and regeneration limit as a function of the partition thickness $t_p$.

Table 1 shows the measurements for Examples 1 to 20 and Comparative Examples 1 to 17. Table 2 shows the measurements for Examples 21 to 30 and Comparative Examples 18 to 24. FIG. 7 shows the measurements of initial trapping efficiency as a function of the average thickness $t_{Ave}$. FIG. 8 shows the measurements of pressure loss as a function of the average thickness $t_{Ave}$. FIG. 9 shows the measurements of regeneration limit as a function of the average thickness $t_{Ave}$. FIG. 10 is a graph summarizing regeneration limit as a function of the pressure loss. FIGS. 7 to 10 summarized the measurements for Examples 1 to 20 and Comparative Examples 1 to 20. FIG. 11 is a graph summarizing film thickness ratio $Y_1$ as a function of the average thickness $t_{Ave}$. FIG. 12 is a graph summarizing film thickness ratio $Y_2$ as a function of the average thickness $t_{Ave}$. FIG. 13 shows the measurements of pressure loss as a function of the hydraulic diameter $HD_{in}$ of an inlet cell. FIG. 14 shows the measurements of pressure loss and regeneration limit as a function of the partition thickness $t_p$.

TABLE 1

| | Porosity % | Pore size μm | Partition thickness μm | Average particle size μm | Upstream film thickness μm | Midstream film thickness μm | Up-and Midstream film thickness μm | Downstream film thickness μm |
|---|---|---|---|---|---|---|---|---|
| Comparative Example 1 | 40 | 15 | 305 | 2.0 | 1.2 | 2.6 | 1.9 | 7.8 |
| Comparative Example 2 | 40 | 15 | 305 | 2.0 | 2.4 | 2.8 | 2.6 | 7.4 |
| Comparative Example 3 | 40 | 15 | 305 | 2.0 | 3.7 | 3.9 | 3.8 | 7.4 |
| Example 1 | 40 | 15 | 305 | 2.0 | 3.6 | 3.8 | 3.7 | 7.5 |
| Example 2 | 40 | 15 | 305 | 2.0 | 1.8 | 3.1 | 2.5 | 11.0 |
| Example 3 | 40 | 15 | 305 | 2.0 | 1.1 | 1.4 | 1.3 | 13.0 |
| Example 4 | 40 | 15 | 305 | 2.0 | 1.1 | 1.4 | 1.3 | 13.0 |
| Comparative Example 4 | 40 | 15 | 305 | 2.0 | 1.1 | 1.4 | 1.3 | 13.0 |
| Comparative Example 5 | 40 | 15 | 305 | 2.0 | 1.0 | 1.1 | 1.1 | 13.0 |
| Comparative Example 6 | 40 | 15 | 305 | 2.0 | 15.0 | 18.0 | 16.5 | 27.0 |
| Example 5 | 40 | 15 | 305 | 2.0 | 14.0 | 18.0 | 16.0 | 28.0 |
| Example 6 | 40 | 15 | 305 | 2.0 | 10.0 | 13.0 | 11.5 | 38.0 |
| Example 7 | 40 | 15 | 305 | 2.0 | 5.2 | 5.6 | 5.4 | 50.0 |
| Example 8 | 40 | 15 | 305 | 2.0 | 5.2 | 5.6 | 5.4 | 50.0 |
| Comparative Example 7 | 40 | 15 | 305 | 2.0 | 5.2 | 5.6 | 5.4 | 50.0 |
| Comparative Example 8 | 40 | 15 | 305 | 2.0 | 4.6 | 5.4 | 5.0 | 50.0 |
| Comparative Example 9 | 40 | 15 | 305 | 2.0 | 33.0 | 36.0 | 34.5 | 51.0 |

TABLE 1-continued

| | | | | | | | | |
|---|---|---|---|---|---|---|---|---|
| Example 9 | 40 | 15 | 305 | 2.0 | 31.0 | 35.0 | 33.0 | 54.0 |
| Example 10 | 40 | 15 | 305 | 2.0 | 21.0 | 38.0 | 29.5 | 61.0 |
| Example 11 | 40 | 15 | 305 | 2.0 | 9.0 | 14.0 | 11.5 | 97.0 |
| Example 12 | 40 | 15 | 305 | 2.0 | 9.0 | 14.0 | 11.5 | 97.0 |
| Comparative Example 10 | 40 | 15 | 305 | 2.0 | 9.0 | 14.0 | 11.5 | 97.0 |
| Comparative Example 11 | 40 | 15 | 305 | 2.0 | 8.0 | 12.0 | 10.0 | 100 |
| Comparative Example 12 | 40 | 15 | 305 | 2.0 | 52.0 | 57.0 | 54.5 | 71.0 |
| Example 13 | 40 | 15 | 305 | 2.0 | 50.0 | 56.0 | 53.0 | 74.0 |
| Example 14 | 40 | 15 | 305 | 2.0 | 42.0 | 48.0 | 45.0 | 89.0 |
| Example 15 | 40 | 15 | 305 | 2.0 | 15.0 | 23.0 | 19.0 | 142 |
| Example 16 | 40 | 15 | 305 | 2.0 | 15.0 | 23.0 | 19.0 | 142 |
| Comparative Example 13 | 40 | 15 | 305 | 2.0 | 15.0 | 23.0 | 19.0 | 142 |
| Comparative Example 14 | 40 | 15 | 305 | 2.0 | 14.0 | 21.0 | 17.5 | 145 |
| Comparative Example 15 | 40 | 15 | 305 | 2.0 | 75.0 | 78.0 | 76.5 | 87.0 |
| Example 17 | 40 | 15 | 305 | 2.0 | 74.0 | 76.0 | 75.0 | 90.0 |
| Example 18 | 40 | 15 | 305 | 2.0 | 53.0 | 72.0 | 62.5 | 114 |
| Example 19 | 40 | 15 | 305 | 2.0 | 22.0 | 34.0 | 28.0 | 184 |
| Example 20 | 40 | 15 | 305 | 2.0 | 22.0 | 34.0 | 28.0 | 184 |
| Comparative Example 16 | 40 | 15 | 305 | 2.0 | 22.0 | 34.0 | 28.0 | 184 |
| Comparative Example 17 | 40 | 15 | 305 | 2.0 | 21.0 | 33.0 | 27.0 | 186 |

| | Average film thickness μm | Y1 | Maximum film thickness μm | Y2 | Hydraulic diameter mm | Pressure loss kPa | Regeneration limit g/L | Initial trapping efficiency % |
|---|---|---|---|---|---|---|---|---|
| Comparative Example 1 | 3.9 | 4.1 | 7.6 | 2.0 | 1.4 | 4.4 | 7.1 | 71 |
| Comparative Example 2 | 4.2 | 2.8 | 8.1 | 1.9 | 1.4 | 4.5 | 7.1 | 73 |
| Comparative Example 3 | 5.0 | 1.9 | 7.6 | 1.5 | 1.4 | 4.5 | 5.9 | 89 |
| Example 1 | 5.0 | 2.0 | 7.7 | 1.6 | 1.4 | 4.5 | 6.6 | 90 |
| Example 2 | 5.0 | 4.5 | 14.0 | 2.6 | 1.4 | 4.5 | 6.8 | 88 |
| Example 3 | 5.0 | 10.0 | 32.0 | 6.4 | 1.4 | 4.6 | 7.0 | 91 |
| Example 4 | 5.0 | 10.0 | 40.0 | 8.0 | 1.4 | 4.6 | 7.0 | 89 |
| Comparative Example 4 | 5.0 | 10.0 | 42.0 | 8.4 | 1.4 | 5.9 | 7.0 | 89 |
| Comparative Example 5 | 5.0 | 12.4 | 18.0 | 3.6 | 1.4 | 5.5 | 7.1 | 88 |
| Comparative Example 6 | 20.0 | 1.6 | 35.0 | 1.8 | 1.3 | 4.7 | 6.1 | 91 |
| Example 5 | 20.0 | 1.8 | 38.0 | 1.9 | 1.3 | 4.7 | 6.8 | 92 |
| Example 6 | 20.0 | 3.3 | 45.0 | 2.2 | 1.3 | 4.7 | 7.0 | 88 |
| Example 7 | 20.0 | 9.2 | 55.0 | 2.7 | 1.3 | 4.8 | 7.2 | 89 |
| Example 8 | 20.0 | 9.2 | 140 | 7.0 | 1.3 | 4.8 | 7.2 | 88 |
| Comparative Example 7 | 20.0 | 9.2 | 150 | 7.5 | 1.3 | 6.0 | 7.2 | 89 |
| Comparative Example 8 | 20.0 | 10.0 | 60.0 | 3.0 | 1.3 | 5.8 | 7.3 | 91 |
| Comparative Example 9 | 40.0 | 1.5 | 40.0 | 1.0 | 1.3 | 4.9 | 6.4 | 92 |
| Example 9 | 40.0 | 1.6 | 72.0 | 1.8 | 1.3 | 4.9 | 7.1 | 91 |
| Example 10 | 40.0 | 2.1 | 68.0 | 1.7 | 1.3 | 4.9 | 7.3 | 89 |
| Example 11 | 40.0 | 8.4 | 60.0 | 1.5 | 1.3 | 5.1 | 7.5 | 90 |
| Example 12 | 40.0 | 8.4 | 226 | 5.7 | 1.3 | 5.1 | 7.5 | 90 |
| Comparative Example 10 | 40.0 | 8.4 | 240 | 6.0 | 1.3 | 6.5 | 7.5 | 89 |
| Comparative Example 11 | 40.0 | 10.0 | 120 | 3.0 | 1.3 | 6.2 | 7.6 | 90 |
| Comparative Example 12 | 60.0 | 1.3 | 72.0 | 1.2 | 1.3 | 5.2 | 6.6 | 89 |
| Example 13 | 60.0 | 1.4 | 75.0 | 1.3 | 1.3 | 5.2 | 7.4 | 90 |
| Example 14 | 60.0 | 2.0 | 90.0 | 1.5 | 1.3 | 5.2 | 7.6 | 92 |
| Example 15 | 60.0 | 7.5 | 118 | 2.0 | 1.3 | 5.4 | 7.8 | 89 |
| Example 16 | 60.0 | 7.5 | 260 | 4.3 | 1.3 | 5.4 | 7.8 | 91 |
| Comparative Example 13 | 60.0 | 7.5 | 270 | 4.5 | 1.3 | 6.6 | 7.8 | 90 |
| Comparative Example 14 | 60.0 | 8.3 | 155 | 2.6 | 1.3 | 6.3 | 7.9 | 89 |
| Comparative Example 15 | 80.0 | 1.1 | 92.0 | 1.2 | 1.2 | 5.4 | 6.9 | 91 |

TABLE 1-continued

| | | | | | | | | |
|---|---|---|---|---|---|---|---|---|
| Example 17 | 80.0 | 1.2 | 106 | 1.3 | 1.2 | 5.4 | 7.7 | 91 |
| Example 18 | 80.0 | 1.8 | 128 | 1.6 | 1.2 | 5.4 | 7.9 | 89 |
| Example 19 | 80.0 | 6.6 | 198 | 2.5 | 1.2 | 5.7 | 8.1 | 90 |
| Example 20 | 80.0 | 6.6 | 238 | 3.0 | 1.2 | 5.7 | 8.1 | 89 |
| Comparative Example 16 | 80.0 | 6.6 | 250 | 3.1 | 1.2 | 7.2 | 8.1 | 92 |
| Comparative Example 17 | 80.0 | 6.9 | 210 | 2.6 | 1.2 | 6.6 | 8.1 | 91 |

TABLE 2

| | Porosity % | Pore size μm | Partition thickness μm | Average particle size μm | Upstream film thickness μm | Midstream film thickness μm | Up-and Midstream film thickness μm | Downstream film thickness μm |
|---|---|---|---|---|---|---|---|---|
| Comparative Example 18 | 40 | 15 | 305 | 2.0 | 58.0 | 75.0 | 66.5 | 120 |
| Comparative Example 19 | 40 | 15 | 305 | 2.0 | 42.0 | 58.0 | 50.0 | 155 |
| Comparative Example 20 | 40 | 15 | 305 | 2.0 | 28.0 | 37.0 | 32.5 | 190 |
| Comparative Example 21 | 40 | 15 | 305 | 2.0 | 21.0 | 38.0 | 29.5 | 61.0 |
| Example 21 | 40 | 15 | 305 | 20 | 21.0 | 38.0 | 29.5 | 61.0 |
| Example 22 | 40 | 15 | 305 | 2.0 | 21.0 | 38.0 | 29.5 | 61.0 |
| Example 23 | 40 | 15 | 305 | 2.0 | 21.0 | 38.0 | 29.5 | 61.0 |
| Example 24 | 40 | 15 | 305 | 2.0 | 21.0 | 38.0 | 29.5 | 61.0 |
| Example 25 | 40 | 15 | 305 | 2.0 | 21.0 | 38.0 | 29.5 | 61.0 |
| Example 26 | 40 | 15 | 305 | 2.0 | 21.0 | 38.0 | 29.5 | 61.0 |
| Comparative Example 22 | 40 | 15 | 305 | 2.0 | 21.0 | 38.0 | 29.5 | 61.0 |
| Comparative Example 23 | 40 | 15 | 140 | 2.0 | 21.0 | 38.0 | 29.5 | 61.0 |
| Example 27 | 40 | 15 | 152 | 2.0 | 21.0 | 38.0 | 29.5 | 61.0 |
| Example 28 | 40 | 15 | 254 | 2.0 | 21.0 | 38.0 | 29.5 | 61.0 |
| Example 29 | 40 | 15 | 356 | 2.0 | 21.0 | 38.0 | 29.5 | 61.0 |
| Example 30 | 40 | 15 | 457 | 2.0 | 21.0 | 38.0 | 29.5 | 61.0 |
| Comparative Example 24 | 40 | 15 | 470 | 2.0 | 21.0 | 38.0 | 29.5 | 61.0 |

| | Average film thickness μm | $Y_1$ | Maximum film thickness μm | $Y_2$ | Hydraulic diameter mm | Pressure loss kPa | Regeneration limit g/L | Initial trapping efficiency % |
|---|---|---|---|---|---|---|---|---|
| Comparative Example 18 | 84.0 | 1.8 | 132 | 1.6 | 1.2 | 6.4 | 8.2 | 89 |
| Comparative Example 19 | 85.0 | 3.1 | 164 | 1.9 | 1.2 | 6.5 | 8.2 | 90 |
| Comparative Example 20 | 85.0 | 5.8 | 195 | 2.3 | 1.2 | 6.5 | 8.2 | 89 |
| Comparative Example 21 | 40.0 | 2.1 | 68.0 | 1.7 | 2.1 | 7.1 | 6.2 | 91 |
| Example 21 | 40.0 | 2.1 | 68.0 | 1.7 | 2.0 | 5.2 | 6.3 | 91 |
| Example 22 | 40.0 | 2.1 | 68.0 | 1.7 | 1.7 | 4.9 | 6.7 | 90 |
| Example 23 | 40.0 | 2.1 | 68.0 | 1.7 | 1.4 | 4.9 | 6.9 | 89 |
| Example 24 | 40.0 | 2.1 | 68.0 | 1.7 | 1.2 | 4.9 | 7.3 | 92 |
| Example 25 | 40.0 | 2.1 | 68.0 | 1.7 | 1.1 | 5.2 | 7.8 | 89 |
| Example 26 | 40.0 | 2.1 | 68.0 | 1.7 | 0.97 | 5.6 | 8.2 | 90 |
| Comparative Example 22 | 40.0 | 2.1 | 68.0 | 1.7 | 0.92 | 7.5 | 8.4 | 91 |
| Comparative Example 23 | 40.0 | 2.1 | 68.0 | 1.7 | 1.5 | 3.4 | 4.7 | 92 |
| Example 27 | 40.0 | 2.1 | 68.0 | 1.7 | 1.5 | 3.5 | 5.1 | 91 |
| Example 28 | 40.0 | 2.1 | 68.0 | 1.7 | 1.4 | 4.5 | 6.8 | 92 |
| Example 29 | 40.0 | 2.1 | 68.0 | 1.7 | 1.3 | 5.3 | 8.4 | 89 |
| Example 30 | 40.0 | 2.1 | 68.0 | 1.7 | 1.2 | 6.4 | 9.8 | 91 |
| Comparative Example 24 | 40.0 | 2.1 | 68.0 | 1.7 | 1.1 | 7.9 | 10.0 | 88 |

FIG. 7 shows that the initial trapping efficiency is low when the average thickness $t_{Ave}$ of the trapping layer is below 5 μm. FIGS. 8 and 9 and Table 1 show that in Examples 1 to 4 and Comparative Examples 3 to 5 the pressure loss and the regeneration limit are appropriate when the film thickness ratio $Y_1$ is 2.0 or more and 10 or less and when the film thickness ratio $Y_2$ is 1.6 or more and 8.0 or less. In Examples 5 to 8 and Comparative Examples 6 to 8, the pressure loss and the regeneration limit are appropriate when the film thickness ratio $Y_1$ is 1.8 or more and 9.2 or less and when the film thickness ratio $Y_2$ is 1.9 or more and 7.0 or less. In Examples 9 to 12 and Comparative Examples 9 to 11, the pressure loss and the regeneration limit are appropriate when the film thickness ratio $Y_1$ is 1.6 or more and 8.4 or less and when the film thickness ratio $Y_2$ is 1.5 or more and 5.7 or less. In Examples 13 to 16 and Comparative Examples 12 to 14, the pressure loss and the regeneration limit are appropriate when the film thickness ratio $Y_1$ is 1.4 or more and 7.5 or less and when the film thickness ratio $Y_2$ is 1.3 or more and 4.3 or less. In Examples 17 to 20 and Comparative Examples 15 to 17, the pressure loss and the regeneration limit are appropriate when the film thickness ratio $Y_1$ is 1.2 or more and 6.6 or less and when the film thickness ratio $Y_2$ is 1.3 or more and 3.0 or less.

FIG. 10 shows that for each average thickness $t_{Ave}$ of the trapping layer the regeneration limit is markedly decreased via an inflection point with decreasing pressure loss. Regarding the relationship between pressure loss and regeneration limit, there is generally a trade-off that the pressure loss and the regeneration limit decrease with increasing porosity or aperture ratio (cell density, the thickness of the partition portion) of the partition portion. For example, an increase in the average thickness $t_{Ave}$ of the trapping layer from 4 μm to 85 μm results in a decrease in temperature rise because of an increase in the heat capacity of the trapping layer, thus gradually improving the regeneration limit. On the other hand, an increase in average thickness $t_{Ave}$ results in a decrease in the effective volume of inlet cells, gradually increasing pressure loss. Thus, a change in average thickness $t_{Ave}$ can also cause a trade-off between pressure loss and regeneration limit. For example, although Examples 17 to 20 and Comparative Examples 15 to 17 aimed to increase the regeneration limit, honeycomb filters having relatively high pressure loss or low regeneration limit, such as Comparative Example 15, which has a low regeneration limit relative to the pressure loss, are unfavorable. In these examples, the reference pressure loss was determined for each average thickness $t_{Ave}$ of the trapping layer, and examples having a pressure loss higher than the reference pressure loss by more than 15% were judged to be Comparative Examples. For example, when the average thickness $t_{Ave}$ of the trapping layer of a honeycomb filter is 5 μm, the reference pressure loss can be 4.5 kPa. When the average thickness $t_{Ave}$ of the trapping layer of a honeycomb filter is 20 μm, the reference pressure loss can be 4.7 kPa.

As shown in FIG. 11, summarizing these results in terms of the film thickness ratio $Y_1$, the regeneration limit is improved when the film thickness ratio Y is $-4/375 \cdot t_{Ave} + 2.05$ or more. It is also shown that a film thickness ratio $Y_1$ of $-17/375 \cdot t_{Ave} + 10.23$ or less results in a moderate downstream thickness $t_l$, thus decreasing permeation resistance and preventing the increase in pressure loss. As shown in FIG. 12, summarizing these results in terms of the film thickness ratio $Y_2$, a film thickness ratio $Y_2$ of $-1/15 \cdot t_{Ave} + 8.33$ or less results in a moderate maximum thickness $t_{max}$ and the prevention of the increase in pressure loss.

FIG. 13 shows that a hydraulic diameter $HD_{in}$ of 0.95 or more results in a large effective surface area for PM deposition, preventing the increase in average permeation rate of the partition and the increase in pressure loss. A hydraulic diameter $HD_{in}$ of 2 or less results in a large effective film area for PM deposition, preventing the increase in pressure loss during PM deposition in a certain amount. FIG. 14 shows that a partition thickness $t_p$ of 150 μm or more results in a high regeneration limit and that a partition thickness $t_p$ of 460 μm or less results in the prevention of the increase in pressure loss. Thus, when the partition thickness $t_p$ is 150 μm or more and 460 μm or less, the average thickness $t_{Ave}$ is 5 μm or more and 80 μm or less, and the relationships of the formulae (1) to (3) are satisfied, the increase in pressure loss can be prevented, and the regeneration efficiency can be increased.

The present application claims the benefit of the priority from Japanese Patent Application No. 2010-81896 filed on Mar. 31, 2010, the entire contents of which are incorporated herein by reference.

INDUSTRIAL APPLICABILITY

The present invention can suitably be applied to filters for purifying exhaust gases emitted from automobile engines, stationary engines for construction equipment, industrial stationary engines, and combustion equipment.

The invention claimed is:
1. A honeycomb filter for trapping and removing solid components contained in a fluid, the honeycomb filter comprising:
a plurality of porous partition portions each forming a cell, the cell being open at one end and closed at the other end and serving as a flow path of the fluid; and
a trapping layer for trapping and removing the solid components contained in the fluid, the trapping layer being disposed on each of the partition portions,
wherein the partition portions have a thickness $t_p$ of 150 μm or more and 460 μm or less, and
the trapping layer has an average thickness $t_{Ave}$ of 5 μm or more and 80 μm or less, and
a film thickness ratio $Y_1$ of a downstream thickness $t_l$ to an up- and mid-stream thickness $t_{hm}$ satisfies the relationship of the formula (1), wherein $t_h$ denotes the thickness of the trapping layer in an upstream region of the honeycomb filter, $t_m$ denotes the thickness of the trapping layer in a midstream region of the honeycomb filter, $t_l$ denotes the thickness of the trapping layer in a downstream region of the honeycomb filter, and $t_{hm}$ denotes the mean value of the upstream thickness $t_h$ and the midstream thickness $t_m$,
a film thickness ratio $Y_2$ of a maximum thickness $t_{max}$ to an average thickness $t_{Ave}$ satisfies the relationship of the formula (2), wherein $t_{max}$ denotes the maximum thickness of the trapping layer, and $t_{Ave}$ denotes the average thickness of the trapping layer, and
the hydraulic diameter $HD_{in}$ of the cell on the inlet side satisfies the relationship of the formula (3).

$$-4/375 \cdot t_{Ave} + 2.05 \leq Y_1 \leq 17/375 \cdot t_{Ave} + 10.23 \qquad (1)$$

$$Y_2 \leq -1/15 \cdot t_{Ave} + 8.33 \qquad (2)$$

$$0.95 \leq HD_{in} \leq 2.0 \qquad (3)$$

2. The honeycomb filter according to claim 1, wherein the upstream thickness $t_h$, the midstream thickness $t_m$, and the downstream thickness $t_l$ satisfy the relationship of the formula (4).

$$t_h \leq t_m < t_l \qquad (4)$$

3. The honeycomb filter according to claim 1, wherein the trapping layer is formed by supplying an inorganic material that is the raw material for the trapping layer to the cell using a gas as a transport medium.

4. The honeycomb filter according to claim 1, wherein the partition portions contain one or more inorganic materials selected from cordierite, SiC, mullite, aluminum titanate, alumina, silicon nitride, sialon, zirconium phosphate, zirconia, titania, and silica.

5. The honeycomb filter according to claim 1, wherein the honeycomb filter is formed by joining two or more honeycomb segments with a bonding layer, each of the honeycomb segments having the partition portion and the trapping layer.

6. The honeycomb filter according to claim 1, wherein the partition portions, the trapping layers, or the partition portions and the trapping layers are loaded with a catalyst.

* * * * *

UNITED STATES PATENT AND TRADEMARK OFFICE
CERTIFICATE OF CORRECTION

PATENT NO. : 8,293,183 B2  
APPLICATION NO. : 13/292757  
DATED : October 23, 2012  
INVENTOR(S) : Takashi Mizutani, Koji Nagata and Yukio Miyairi Page 1 of 1

It is certified that error appears in the above-identified patent and that said Letters Patent is hereby corrected as shown below:

Column 28, Line 62  
(claim 1), line 32: please change "$-4/375 \cdot t_{Ave}+2.05<Y_1< 17/375 \cdot t_{Ave}+10.23$" to -- $-4/375 \cdot t_{Ave}+2.05 \leq Y_1 \leq -17/375 \cdot t_{Ave}+10.23$ --.

Signed and Sealed this  
Twenty-fifth Day of December, 2012

David J. Kappos  
*Director of the United States Patent and Trademark Office*